US 6,690,948 B1

(12) United States Patent
Takiguchi et al.

(10) Patent No.: US 6,690,948 B1
(45) Date of Patent: Feb. 10, 2004

(54) DATA TRANSMISSION TERMINAL APPARATUS, DATA COMMUNICATING METHOD, AND DATA COMMUNICATION SYSTEM

(75) Inventors: Kiyoaki Takiguchi, Kanagawa (JP); Takaaki Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/391,521

(22) Filed: Sep. 8, 1999

(30) Foreign Application Priority Data

Sep. 9, 1998 (JP) .......................... P10-255578

(51) Int. Cl.⁷ ............................... H04B 1/38
(52) U.S. Cl. ................ 455/557; 455/426; 455/456
(58) Field of Search ............... 455/556, 557, 455/457, 555, 560, 414, 456, 426, 466; 342/457, 357

(56) References Cited

U.S. PATENT DOCUMENTS

| 4,972,457 A | | 11/1990 | O'Sullivan | 379/59 |
| 5,218,367 A | * | 6/1993 | Sheffer et al. | 455/456 |
| 5,541,589 A | | 7/1996 | Delaney | 340/870.02 |
| 5,771,455 A | * | 6/1998 | Kennedy et al. | 455/414 |
| 5,873,039 A | | 2/1999 | Najafi | 455/454 |
| 6,140,956 A | * | 10/2000 | Hillman et al. | 342/357.05 |
| 6,331,825 B1 | * | 12/2001 | Ladner et al. | 342/457 |

FOREIGN PATENT DOCUMENTS

| EP | 9411999 | 5/1994 | ............ H04Q/7/04 |
| EP | 8046712 | 2/1996 | ............ H04M/11/00 |
| EP | 0726687 | 8/1996 | ............ H04Q/7/32 |
| EP | 10145828 | 5/1998 | |
| WO | 9302515 | 2/1993 | ............ H04L/12/48 |

OTHER PUBLICATIONS

*An In–Band Power–Saving Protocol for Mobile Data Networks*, Salkintzis et al., IEEE Transactions and Communications, vol. 46, No. 9, pp. 1194–1205, Sep., 1998.

*Quick RF Power Adjust For Wireless Packet Modems Subscriber Devices*, D.E. Burke, Motorola Technical Developments, May 1996, pp. 148–149.

* cited by examiner

Primary Examiner—Edward F. Urban
Assistant Examiner—Tilahun Gesesse
(74) Attorney, Agent, or Firm—Jay H. Maioli

(57) ABSTRACT

In the case that a telephone communication line of a portable type wireless telephone terminal is formed between a data transmission terminal apparatus and a data acquisition apparatus with respect to a data communication counter party, the data transmission terminal apparatus sends out data as a dial signal via the wireless telephone terminal to the telephone communication line. As a result, the data is received in the form of the DTMF signal to the data acquisition apparatus.

16 Claims, 17 Drawing Sheets

POSITIONAL DATA FORMAT

STRUCTURE OF TERMINAL CONTROL APPARATUS

FIG. 7  DATA TRANSMISSION FROM MOBILE TERMINAL BY TELEPHONE CALL

DATA TRANSMISSION TERMINAL APPARATUS, DATA COMMUNICATING METHOD, AND DATA COMMUNICATION SYSTEM

BACKGROUND OF THE INVENTION

1. Field of the Invention

The present invention is related to a data transmission terminal apparatus, a data communicating method, and a data communication system, capable of transmitting, for instance, data via a wireless telephone line of a portable telephone to a communication counter party such as a data acquisition center.

2. Description of the Related Art

In general, in a data communication with employment of a wireless telephone line of a portable telephone, a modem is used. To execute such a data communication with using the modem, after a voice (speech) communication line for a telephone is linked, a negotiation for communicating data is carried out, so that a data communication link must be formed. That is, FIG. 1 shows a sequence diagram in the case that a data communication is carried out by issuing a telephone call from a portable terminal. As indicated in FIG. 1, the portable terminal first issues a telephone call to a counter party of this data communication so as to form a telephone communication link. Next, the portable terminal sends out a data communication request in order to execute the data communication via the modem, and makes a negotiation between the own portable terminal and the modem of the communication counter party so as to form a data communication link. After this data communication link has been formed, the data communication can be carried out between the portable terminal and the communication counter party via both the modems thereof.

As explained above, in the conventional data communication with employment of the wireless line of the portable telephone, after the telephone communication link has been established, the negotiation must be made between the modems of both sides in order to perform the data communication. To establish such a negotiation, several tens of seconds of negotiation time are required. As a result, even when information having such a small data capacity actually constituted by approximately 20 numerals is data-transmitted, for example, latitude/longitude information of positional information about the portable terminal side, such a lengthy time period of several tens of seconds to 1 minute is necessarily required. This conventional data communication system owns the problems as to the communication cost (communication fee) and the power consumption.

For example, in such an assumption case that while the conventional data transmission system is provided with a vehicle and an aged person who loiters from place to place without having his clear intention, the data transmission system automatically transmits positional information at proper timing, the following aspects are important view points. That is, the power consumption of this conventional data transmission system is reduced as much as possible, and this data transmission system can be driven by batteries as long as being permitted.

To reduce such redundant setting time, one solution method has been proposed. That is, the communication negotiation time with respect to the counter party, whose communication condition is previously set, is omitted by using the call issuer number notification so as to shorten the entire communication time, resulting in a reduction of communication fee.

This conventional data communication method may have a merit when an electronic mail is transmitted/received under stationary condition of a moving object. However, since the data is communicated in the non-sequential manner in this conventional method, for instance, in such a case that the data communication is carried out while a vehicle is driven in a high speed, if the wireless channels of the base stations are frequently switched, the following problem will occur. That is, even under such a better environment that the voice communication itself could be made in better electric field strength, the communication errors occur many times.

To avoid such a problem, the error correction and also the retry process which have been originally established in the layer lower than the transport layer of the telephone communication level of the digital portable telephone network must be newly executed in the application layer. That is, duplicate process operation is required in such a way that the error correction and the retry process are again established on the data communication transport layer. As a result, the communication time becomes redundant, and the overall system becomes complex.

SUMMARY OF THE INVENTION

The present invention has been made to solve the above-described various problems, and therefore, has an object to provide a data transmission terminal apparatus and a data transmission method, capable of transmitting data at a high speed under low power consumption.

To achieve the above described object, a data transmission terminal apparatus, according to an aspect of the present invention, includes:

a data transmission terminal apparatus including a portable type wireless telephone terminal, and a terminal control apparatus connected to the wireless telephone terminal, for performing a data communication by using a line of the portable type wireless telephone terminal; and a data acquisition apparatus for communicating the data with the data transmission terminal apparatus; wherein:

in such a case that a telephone communication line of the portable type wireless telephone terminal is formed between the data transmission terminal apparatus and the data acquisition apparatus while involving a public telephone network, since the data transmission terminal apparatus sends out data as a dial signal from the terminal control apparatus via the wireless telephone terminal to the telephone communication line, the data is received in the form of a DTMF signal by the counter part of the data communication.

In accordance with the data transmission terminal apparatus of the present invention, after the telephone communication link is formed, the data is sent out as the dial signal. As a result, the data communication link is no longer formed, and therefore, the data can be transmitted to the counter party via the telephone communication line. Then, the counter party receives the data as the DTMF tone to decode this received data, and can readily demodulate the data.

As a consequence, the negotiation for the data communication link in the related art is no longer required in the data transmission terminal apparatus, so that the communication cost can be reduced and furthermore the power consumption can be lowered.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, a data transmission terminal apparatus, a data transmitting method, and a data communication system, according to a preferred embodiment of the invention, will be described in detail.

Figure 1:
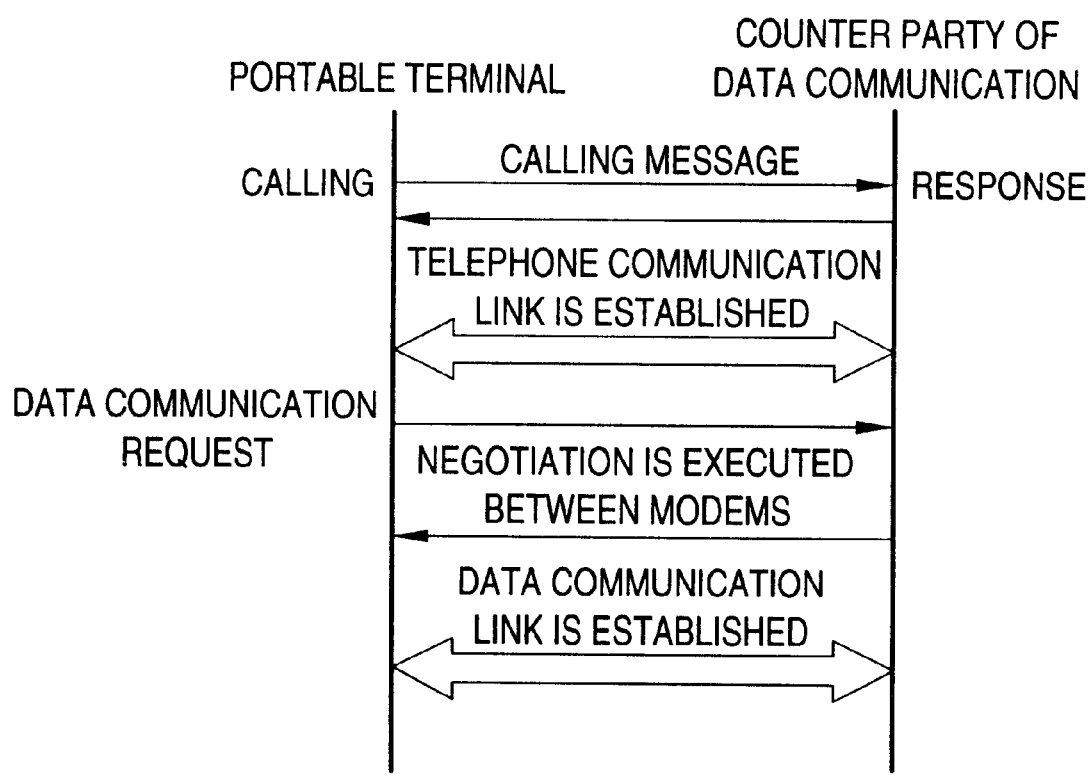
FIG. 1 is a sequential diagram for explaining the conventional data communication system.
Figure 2:
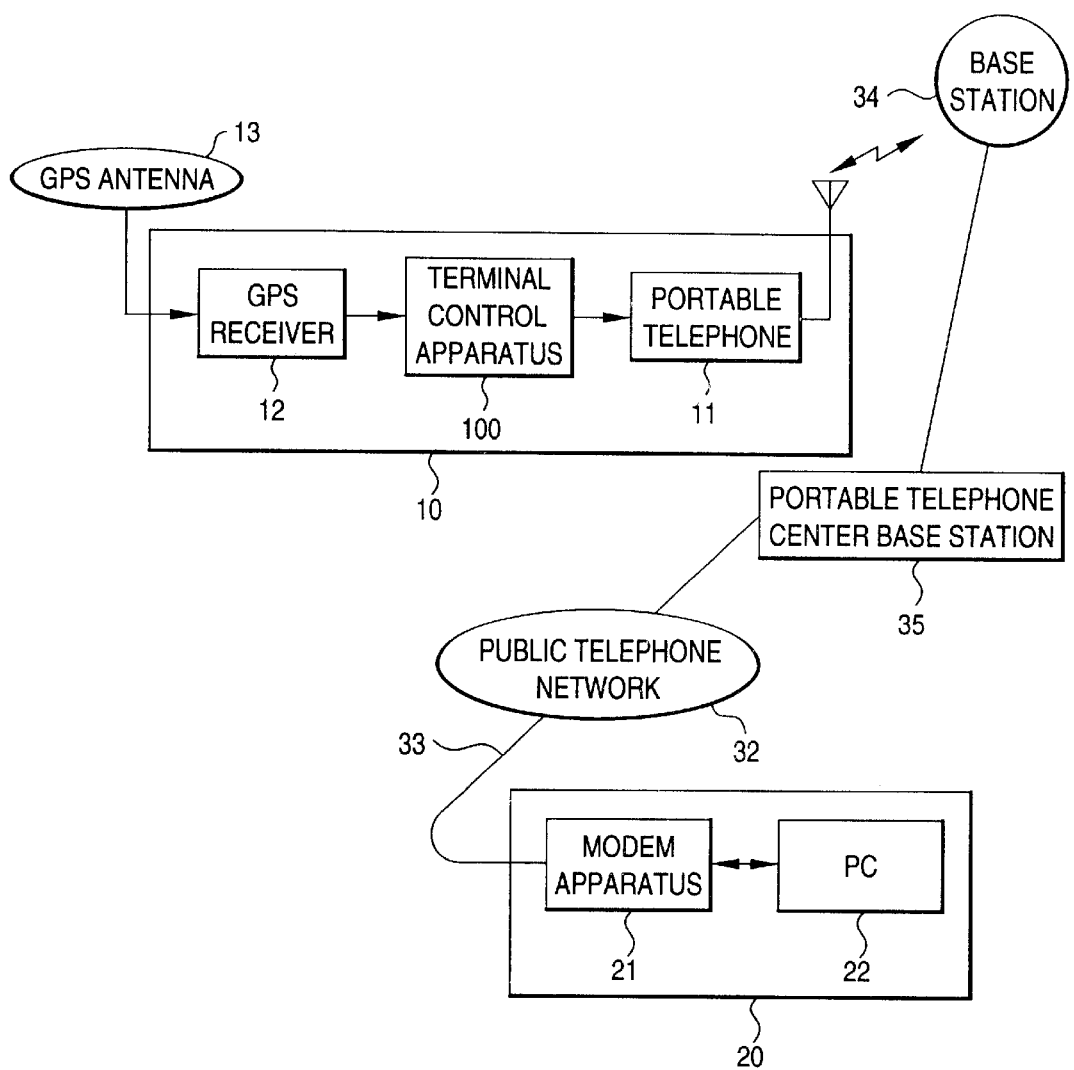
FIG. 2 is an explanatory block diagram for showing a conceptual idea of a data communication system according to a mode of the present invention.

FIG. 2 is a schematic block diagram for representing a conceptional structure of a data communication system of an embodiment (will be described below). That is, the data communication system of this embodiment mode is arranged by such that both a data transmission terminal system 10 and a data acquisition center 20 are connected to each other via a wireless (radio) line 31 for a portable telephone and a wired public telephone network 32.

The data transmission terminal system 10 is mounted on, for example, a mobile member (moving object) such as a vehicle, and transmits positional information of this vehicle in response to a transmission request (command) issued from the data acquisition center 20. Also, even when no transmission request is issued from the data acquisition center 20, the data transmission terminal system 10 automatically transmits positional information of the vehicle to the data acquisition center 20 in such a case that, for instance, this data transmission terminal system 10 is mounted/released on/from the vehicle, the vehicle starts to move, and the transport (movement) of the vehicle is stopped.

As represented in FIG. 2, the data transmission terminal system 10 is constituted by a portable telephone 11, a GPS (Global Positioning System) receiver 12 for measuring a position, and a terminal control apparatus 100 for controlling a transmission of positional information through the portable telephone 11 and also for controlling an operating power supply of the data transmission terminal system 10.

As the portable telephone 11, commercially available portable telephones equipped with data communication terminals may be used. It should be noted that these commercially available portable telephones operable for more than 40 hours are suitably employed when batteries mounted on these portable telephones are recharged under full charging condition.

The GPS receiver 12 receives via a GPS antenna 13 information transmitted from at least 3 or more satellites, and calculates a present position of a mobile member (moving object) such as a vehicle on which this GPS receiver 12 is mounted based upon the received information. Then, the GPS receiver 12 transmits the calculated positional information to the terminal control apparatus 100 every time, for example, a preselected time interval has passed.

The terminal control apparatus 100 is connected to the GPS receiver 12, and further to the data communication terminal of the portable telephone 11. The data derived from the terminal control apparatus 100 is transmitted to the portable telephone 11 in a transfer rate of, for example, 600 bps. To send out the positional information acquired from the GPS receiver 12 by the portable telephone 11, the terminal control apparatus 100 transmits an off-hook command, an on-hook command, or a dial command to the portable telephone 11.

Also, the terminal control apparatus 100 is equipped with a memory for storing thereinto a telephone number of the data acquisition center 20, and automatically makes a dial calling operation via the portable telephone 11 to the data acquisition center 20.

Also, when a telephone call is received by the portable telephone 11, the terminal control apparatus 100 judges as to whether or not a telephone call is issued from the data acquisition center 20 based upon the calling number contained in this telephone calling message, and then accepts only the telephone call issued from the data acquisition center 20 and further refuses to receive other telephone calls. In this case, the terminal control apparatus 100 makes such a judgment that the telephone call issued from the data acquisition center 20 is to request sending of positional information.

Then, in the case that a telephone communication link containing the data acquisition center 20 and a wireless line of a portable telephone is formed by issuing such a telephone call by this terminal control apparatus 100 itself, or receiving a telephone call sent from the data acquisition center 20, the terminal control apparatus 100 sends out the positional information acquired from the GPS receiver 12 as a dial signal at such timing (will be described later).

That is to say, first, the terminal control apparatus 100 sends a dial command to the portable telephone 11, and subsequently transmits positional information as the dial signal to the portable telephone 11. The positional information is expressed by such a code, for instance, 21 digits of numeral numbers and symbols.

The portable telephone 11 transmits a dial signal indicative of the positional information after the dial command via the antenna while maintaining this code data in a wireless signal form. As will be discussed later, the code data is converted into a DTMF signal (DTMF tone) in a center base station of a portable telephone, and is received as a DTMF tone on the side of the data acquisition center 20.

Also, the terminal control apparatus 100 performs a power consumption control in such a manner that power consumption of the GPS receiver 12 and of the own terminal control apparatus 100 can be reduced as much as possible in accordance with a frequent degree of telephone calls (polling operations) issued from the data acquisition center 20. Furthermore, the transmission mode of the positional information may be changed, depending upon the frequent degree of the polling operation, and also the line holding time between this terminal control apparatus 100 and the data acquisition center 20.

On the other hand, the data acquisition center 20 is arranged by a modem apparatus 21 equipped with a function for decoding a DTMF tone, and a personal computer 22. The modem apparatus 21 is connected to a telephone line 33 which is connected to the public telephone network 32, and performs a converting operation between a signal in a voice range (band) and digital data of "1" and "0". In this example, the modem apparatus 21 owns a function for decoding a DTMF tone contained in a voice (speech) signal into code data of numerals and symbols and also for transferring the decoded data to the personal computer 22. Also, the modem apparatus 21 owns a line control function with respect to the telephone line 33. For instance, the modem apparatus 21 further owns a function for switching a telephone call of a voice telephone communication to a telephone set (not shown) for receiving the telephone call in addition to the telephone calling/call receiving function.

The personal computer 22 owns a function capable of restoring positional information from code data equal to a signal produced by decoding a DTMF tone derived from the modem apparatus 21. Also, the personal computer 22 has a function for changing/controlling a transmission operation of positional information transmitted from the data transmission terminal system 10 in response to a request from the data acquisition center 20 into 4 sorts of transmission operations in this example. The changing/controlling operation is carried out based upon a polling frequent degree by the data acquisition center 20 and a time duration of hold time of a telephone line.

In this embodiment, as the transmission operation mode of the positional information transmitted from the data transmission terminal system 10, 4 sorts of transmission operations may be set, i.e., a continuous transmission operation, a single transmission operation, an interrupt transmission operation, and a blocking transmission operation (will be described in detail).

In accordance with a frequent degree of polling operation from the data acquisition center 20 to the data transmission terminal system 10, the data transmission terminal system 10 controls the operating power supply thereof. While the control of the operating power supply is performed by the terminal control apparatus 100, this terminal control apparatus 100 controls not only the operating power supply of the GPS receiver 12, but also the operating power supply of the terminal control apparatus 100 so as to minimize the power consumption.

As previously explained, in this embodiment the positional information transmitted from the data transmission terminal system 10 is received as the DTMF tone in the low transfer rate in the data acquisition center 20, whereas data is transmitted from the data acquisition center 20 to the data transmission terminal system in such a high-speed data transfer rate as 9,600 baud which can be adapted to the modem apparatus 21.

As a consequence, both almanac information and ephemeris information may be downloaded from the data acquisition center 20 to the GPS receiver 12 in the high-speed data transfer rate. The almanac information and ephemeris information are required in order that, for instance, the GPS receiver 12 of the data transmission terminal system receives electromagnetic waves sent from a plurality of satellites so as to calculate a position measuring operation.

It should also be noted that CTI may be employed as the modem apparatus 21 of the data acquisition center 20.

SUMMARY OF POSITIONAL INFORMATION TRANSMITTING METHOD

As previously described, in accordance with one embodiment, the positional information derived from the data transmission terminal system 10 is transmitted as the dial signal without employing the modem apparatus, and then, the dial signal is received as the DTMF tone on the side of the data acquisition center 20. The positional information transmitting method will now be summarized with reference to sequence diagrams shown in FIG. 2 and FIG. 3, while exemplifying such a case that the data transmission terminal system 10 calls the data acquisition center 20 so as to send the positional information.

Figure 3:
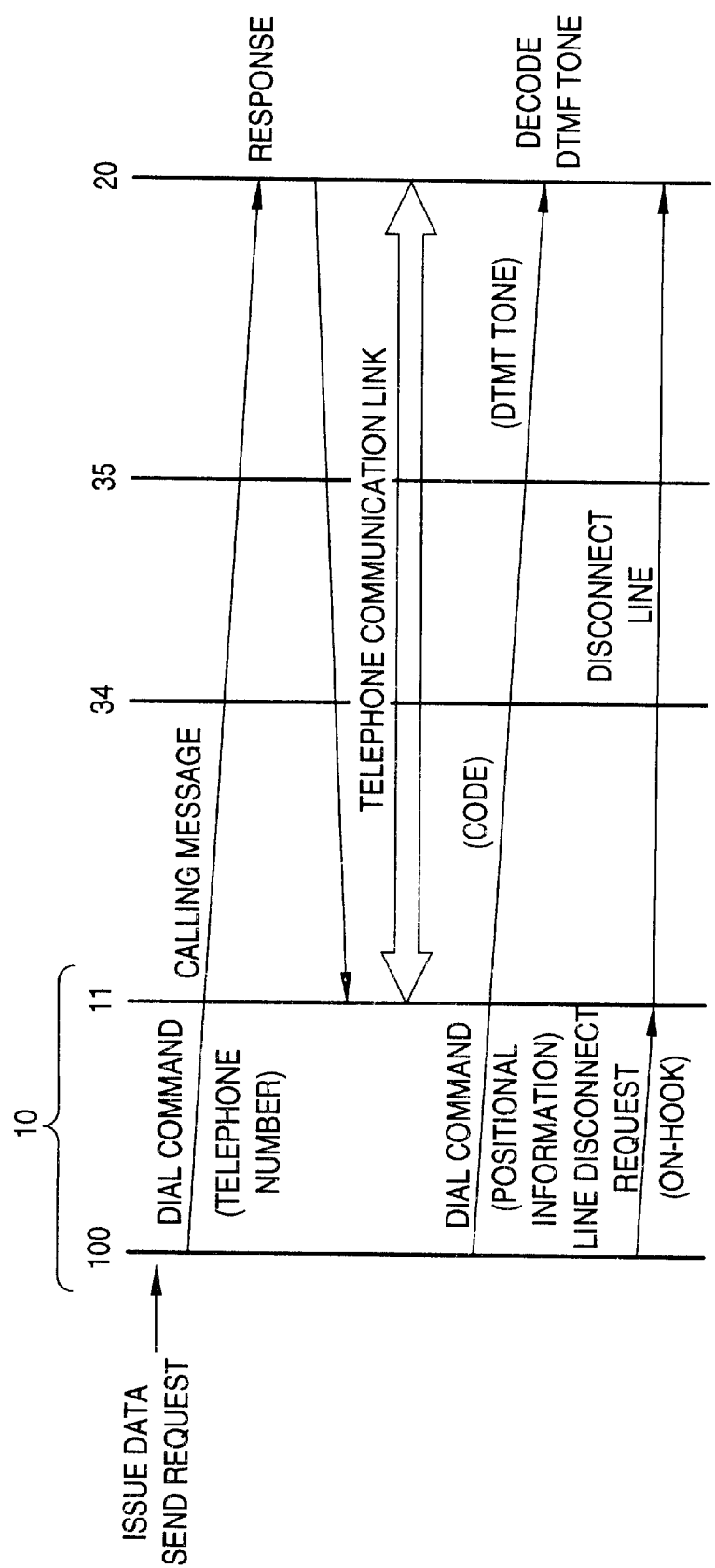
FIG. 3 is a sequential diagram for explaining a data transmission mode executed in the embodiment mode of the present invention.

In other words, as indicated in FIG. 3, as previously explained, in such a case that a certain data transmission factor occurs, for example, a vehicle moving operation is stopped or is commenced in the data transmission terminal system 10, the terminal control apparatus 100 sends out both an off-hook command and a dial command used to call the data acquisition center 20, and sends out a dial signal for a telephone number of the data acquisition center 20.

Upon receipt of these dial command and dial signal, the portable telephone 11 establishes the wireless line 31 between the own portable telephone 11 and the base station 34, and then sends out a calling message for calling the telephone communication counter party, namely the data acquisition center 20. The calling message is sequentially sent via the wireless line 31, the base station 34, the portable telephone center base station 35, and the public telephone network 32 to the data acquisition center 20.

The personal computer 22 of the data acquisition center 20 confirms based on a telephone calling number contained in the message that a message transmission destination is the data transmission terminal system 10. Then, the personal computer 22 responds to the telephone calling message, and also is prepared for receiving a DTMF tone which may be sent subsequent to this telephone calling message.

When the data acquisition center 20 responds to the telephone calling message, as indicated in FIG. 3, a telephone communication link involving the wireless line is established. After this telephone communication link is established, the terminal control apparatus 100 of the data transmission terminal system 10 retransmits the dial command, and subsequently sends out the positional information acquired from the GPS receiver 12 as data indicated by the dial signal. As a result, the portable telephone 11 directly sends out the positional information expressed by the dial signal (code data) to the established telephone communication line.

Figure 4:
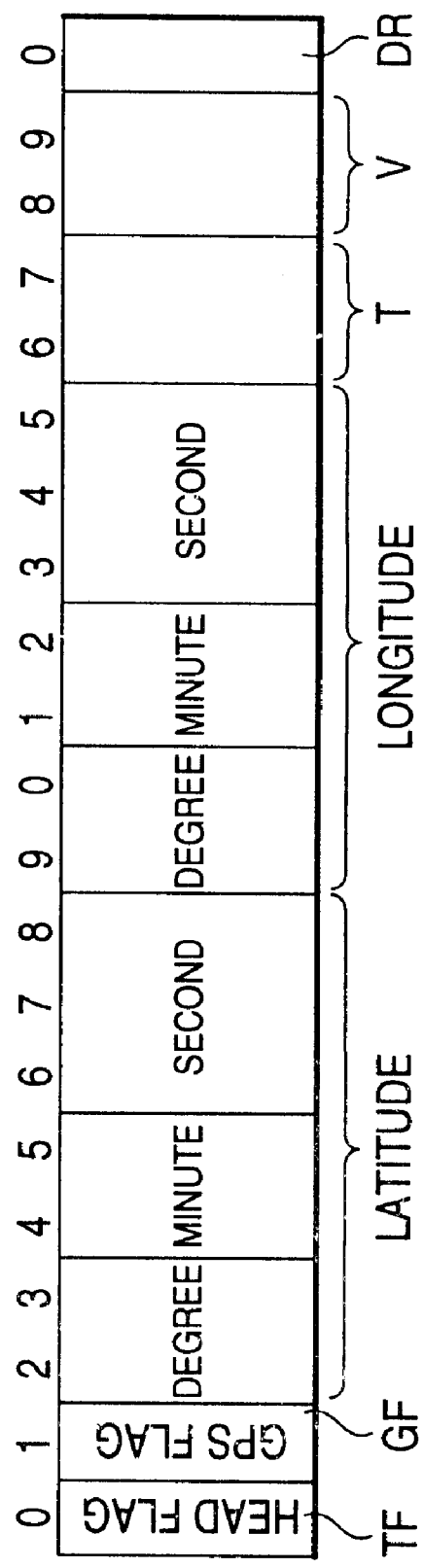
FIG. 4 is a diagram for explaining a transmission data format used in the embodiment mode of the present invention.

FIG. 4 represents an example of a data format of the positional information which is sent out at this time. In the example, for instance, the positional information is expressed by 21 digits of numeral values and symbol information. As a head flag "TF", symbol "#" is inserted at the first top digit of the 21-digit information. The second digit is used as a GPS operating state flag GF. The GPS operating state flag GF is defined as follows:

GF=0 - - - GPS under operation,
GF=1 - - - GPS operation stop,
GF=2 - - - GPS operation start,
GF=3 - - - GPS receiver release,
GF=4 - - - GPS receiver set, Based upon the operating flag GF, it is possible to sense as to whether or not a mobile member such as a vehicle on which the data transmission terminal system 10 is mounted is driven under any condition.

7 digits subsequent to the GPS operating flag GF indicate latitude of positional information, and 7 digits after the above-described 7 digits represent longitude of the positional information. Both the latitude and the longitude are expressed as 2 digits of "degree", 2 digits of "minute", and 3 digits of "second", respectively, and "second" is equal to resolution of 0.1 second. It should be understood that as "degree" of the longitude, 3 digits are required when the GPS receiver is positioned within Japan. In this example, as the transmission data, only lower 2 digits are transmitted, and an upper 1 digit is additionally provided on the side of the data acquisition center 20.

2 digits appearing after the longitude indicate a time instant difference "ΔT (minute)" calculated from the latest new data. The time instant difference "ΔT" is expressed as follows:

ΔT=00 . . . new data itself
ΔT=01 to 99 . . . old data (data less than 1 minute are set to 0.1 through 0.9)

The next 2 digits indicate a speed "V" of a mobile member such as a vehicle on which the data transmission terminal system 10 is mounted in unit of [km/h]. In this example, the speed "V" is expressed as follows:

V=00 to 99 - - - less than 100 km/h,
V=*0 - - - 100 to 109 km/h,
V=*1 - - - 110 to 119 km/h,
V=*2 - - - 120 to 129 km/h,
- - - ,
V=*9 - - - 190 to 199 km/h.

The last 1 digit expresses a direction "DR". The last 1 digit indicates a moving direction, and is expressed as follows:

DR=0 - - - range less than, or equal to 10 km (direction is not indicated),
DR=1 to 8 - - - sequentially indicating the north/northeast/east/southeast/south/southwest/west/northwest.

The code data of the positional information which is transmitted from the portable telephone 11 in the above-described manner is converted into the DTMF tone (DTMF signal) in the portable telephone center base station 35. Then, the positional information expressed by this DTMF sound is received via the public telephone-network 32 by the modem apparatus 21 of the data acquisition center 20. The modem apparatus 21 restores the received DTMF tone into the code data such as the numbers and the symbols, and then sends the code data to the personal computer 22.

The personal computer 22 restores the positional information from the code data in accordance with the data format shown in FIG. 4 so as to judge the position of the data transmission terminal system 10. For example, the personal computer 22 displays the position of the mobile member such as the vehicle on which the data transmission terminal system 10 is mounted on the map displayed on the screen of the monitor receiver connected to the personal computer 22.

In such a case that the data acquisition center 20 calls the data transmission terminal system 10 so as to request a transmission of positional information, there is no change in the sequential operation for transmitting the positional information except for such a sequential operation until the telephone communication link of FIG. 3 is produced.

DETAILED STRUCTURAL EXAMPLE OF DATA TRANSMISSION TERMINAL SYSTEM

Figure 5:
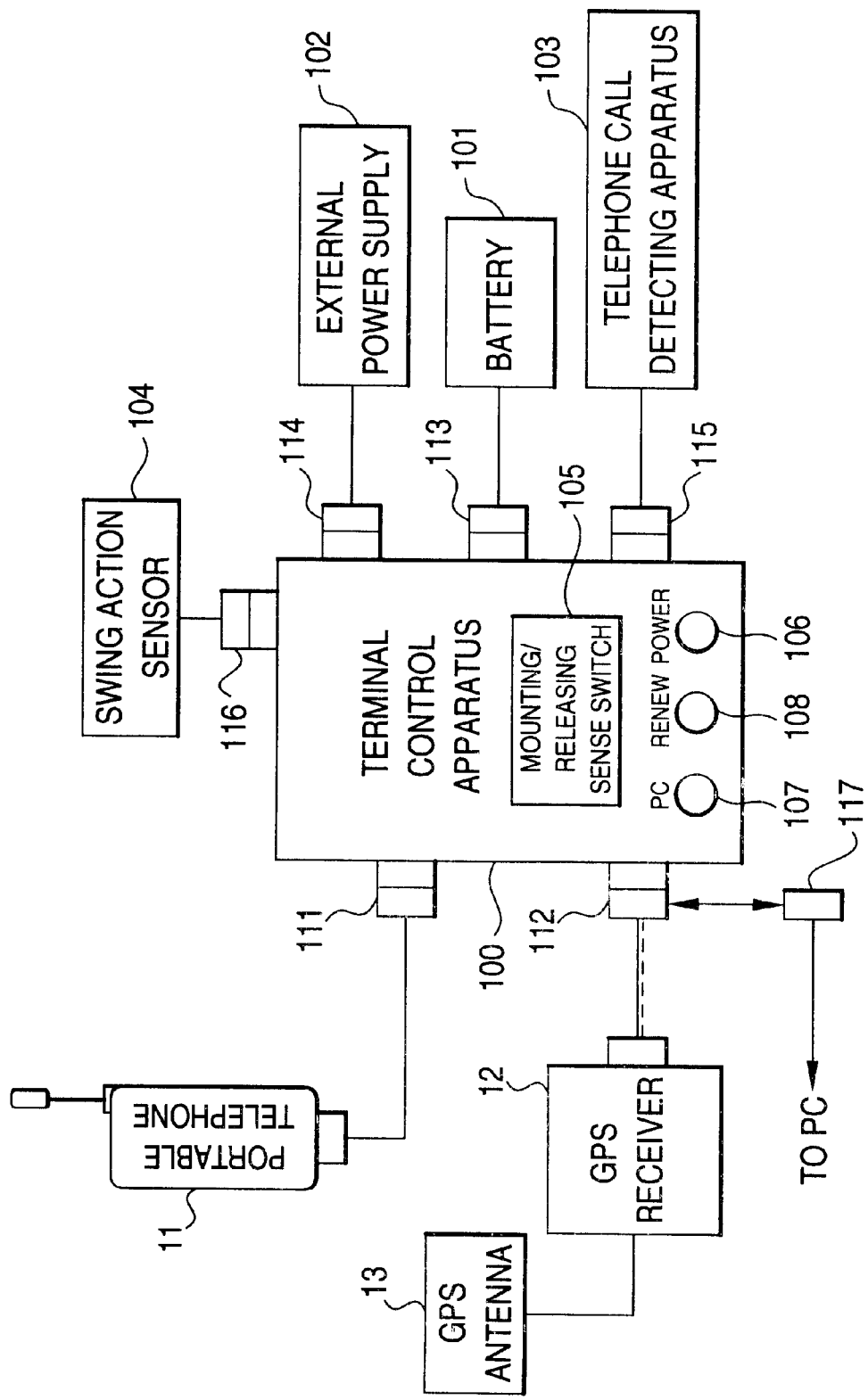
FIG. 5 is a schematic block diagram for representing an example of a data transmission terminal apparatus according to an embodiment mode of the present invention.

FIG. 5 is a schematic block diagram for showing a structural example of the data transmission terminal system.

That is, a terminal 111 of a terminal control apparatus 100 is connected to the portable telephone 11. Also, another terminal 112 of the terminal control apparatus 100 is connected to the GPS receiver 12. The terminal 112 contains a power supply control line of the GPS receiver 12.

In the terminal control apparatus 100, a battery 101 is used as the power source thereof, and also an external power supply 102 may be employed. The battery 101 is connected through another terminal 113 to the terminal control apparatus 100, and the external power supply 102 is connected via a further terminal 114 to the terminal control apparatus 100. The external power supply 102 is used under such a condition that the data transmission terminal system 10 is not mounted on the mobile member when the almanac information and the like are written. In the case that the external power supply 102 is employed, the GPS receiver 12 is continuously energized so as to be set to the operation condition. When this GPS receiver 12 is mounted on the mobile member, the GPS receiver 12 is driven by the battery 101.

As will be discussed later, in this embodiment, there are cases where not only the GPS receiver 12, but also the terminal control apparatus 100 itself are brought into the power OFF mode in order to reduce the power consumption. In this case, in order that the terminal control apparatus 100 of the data transmission system 10 is energized by receiving a telephone call issued from the data acquisition center 20, a telephone call-detecting apparatus 103 is employed in such a manner that this telephone call detecting apparatus 103 is connected via a terminal 115 to the terminal control apparatus 100. In response to a telephone call, this telephone call detecting apparatus 103 detects the telephone call by detecting the electromagnetic wave sent from the portable telephone 11.

A swing action sensor 104 is connected via another terminal 116 to the terminal control apparatus 100. This swing action sensor 104 senses movement of the mobile member on which the data transmission terminal system 10 is mounted. In this example the swing action sensor 104 employs an element of a contact output, which senses the drive action and the stop action of the mobile member.

In the case that the data transmission terminal system 10 is mounted on, for example, an automobile, the swing action sensor 104 may also sense vibrations of an engine and a peripheral component thereof. The swing action sensor 104 judges the drive/stop actions of the automobile by sensing the duration of vibrations for a constant time period, for instance, 1 minute by using a timer. As a result, the swing action sensor 104 can properly grasp the drive condition of the mobile member on which the data transmission terminal system 10 is mounted.

Furthermore, a personal computer is connectable via another terminal 117 to the terminal control apparatus 100. This personal computer is used to set the telephone number of the data acquisition center 20, the telephone number of the data transmission terminal system 10, and other parameters. Also, this personal computer may be employed so as to download the almanac information and the like for the GPS receiver 12, since the operation of the terminal system 10 is commenced from such a condition that this terminal system 10 is not used while not being mounted on the mobile member.

A mounting/releasing sense switch 105 is provided with the terminal control apparatus 100. This mounting/releasing switch 105 is constituted by a microswitch for detecting mounting/releasing of the data transmission terminal system 10. The mounting/releasing sense switch 105 detects mounting/releasing of the data transmission terminal system 10 for the continuous time period longer than, or equal to, e.g., 1 minute, while temporal action caused by vibrations is neglected. The detecting operation for mounting/releasing of the terminal system 10 is carried out in a software manner.

A power supply switch 106 corresponds to the ON/OFF switch of the main power supply employed in the terminal control apparatus 100. A PC connection switch 107 is employed so as to switch a serial port between the personal computer and the GPS receiver 12. An almanac update switch 108 corresponds to such a switch for update the almanac by continuously receiving the GPS signal outputted from the GPS receiver 12 while the data transmission terminal system 10 is not used.

Figure 6:
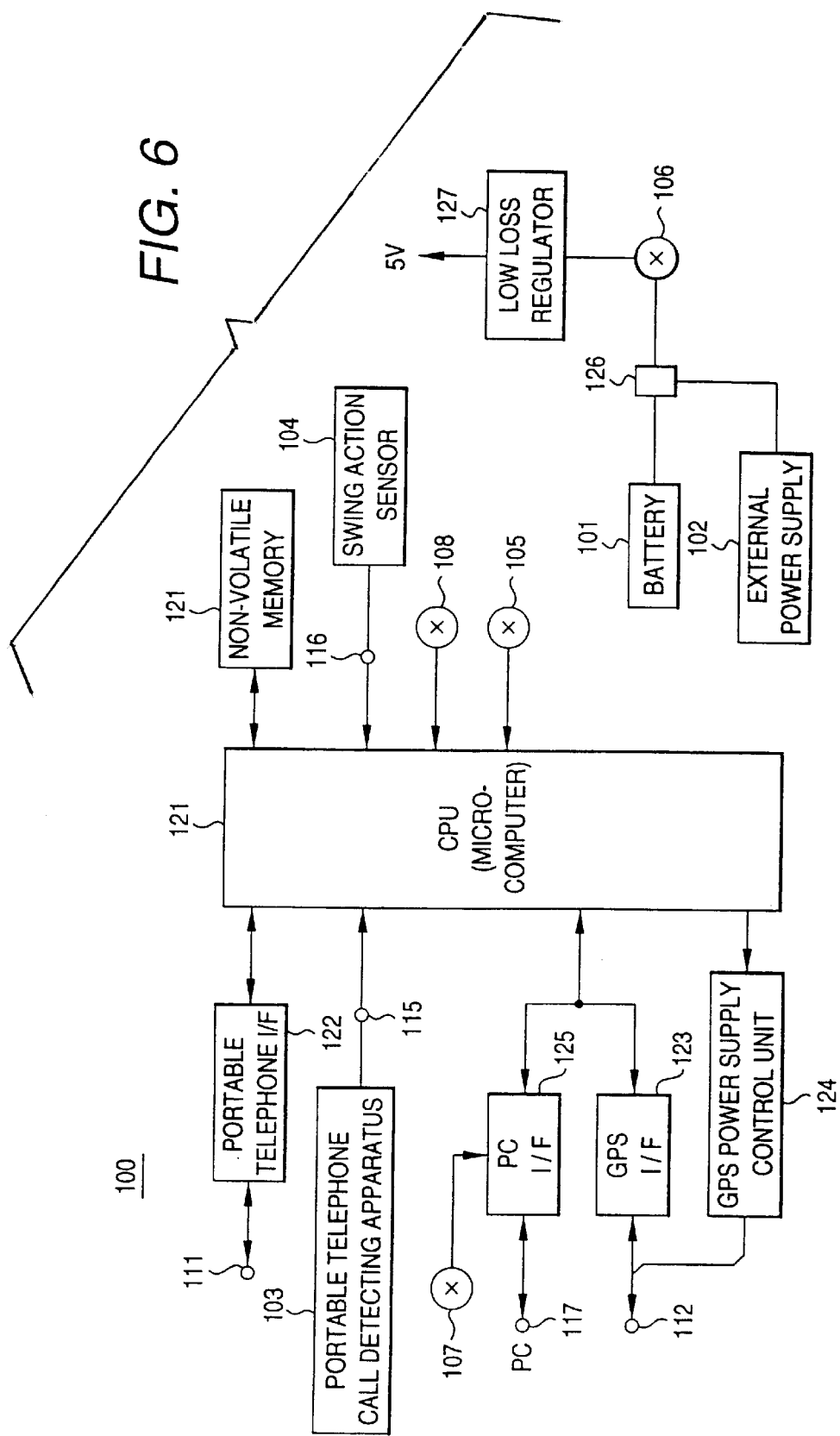
FIG. 6 is a schematic block diagram for indicating an example of a terminal control apparatus shown in FIG. 5.

FIG. 6 indicates a structural example of the terminal control apparatus 100. In other words, the terminal control apparatus 100 is equipped with a CPU (microcomputer) 120, a non-volatile memory 121, a portable telephone interface 122, a GPS interface 123, a GPS power supply control unit 124, a PC (personal computer) interface 125, a power supply switching connector 126, and a low loss regulator circuit 127.

The non-volatile memory 121 is constituted by an EPROM, an SRAM, an EEPROM and so on, and stores thereinto the telephone number of the data acquisition center 20, and other parameters.

The GPS power supply control unit 124 is to control the electric power supplied from the terminal control apparatus 100 to the GPS receiver 12. This GPS power supply control unit 124 controls the ON/OFF operation, and furthermore, may apply a back-up voltage by directly dropping the power supply voltage by using a diode and the like so as not to delete the storage contents of the memory in the GPS receiver 12.

For instance, when the external power supply 102 is connected, the power supply switching connector 126 is switched to the external power supply side, whereas when the external power supply 102 is not connected, this power supply switching connector 126 is switched to use the battery 101 as the power supply. A voltage of 5 V which is regulated by the low loss regulator 127 is supplied to the respective circuit portions of the terminal control apparatus 100, and also is supplied via the GPS power supply control unit 124 to the GPS receiver 12.

TRANSMISSION OF POSITIONAL INFORMATION BY RECEIVING TELEPHONE CALL FROM DATA TRANSMISSION TERMINAL SYSTEM 10

As previously described, in the case that either the mobile member on which the data transmission terminal system 10 according to this embodiment is mounted stops or starts to move from the stop condition, the data transmission terminal system 10 notifies this condition to the data acquisition center 20 by using the GPS flag GF. Also, the data transmission terminal system 10 sends out the positional information at this time. The stopping condition of the mobile member such as the vehicle, or the starting condition of the mobile member is sensed by monitoring the sensor output from the swing action sensor 104. As an application mode, the starting condition of the mobile member may be sensed by using a switch provided outside the data transmission terminal system 10, instead of using such a sensor output.

At this time, when the movement of the mobile member is commenced from the stopping condition, in the case that new positional information cannot be acquired by the GPS receiver 12, if the positional information has been acquired and saved during the previous stopping condition, the positional information acquired during the previous stopping condition is sent out. Thereafter, when the new positional data can be acquired, this new positional data is transmitted to the data acquisition center 20.

Furthermore, in the case that the mounting/releasing sense switch senses such a fact that the data transmission terminal system 10 is released (dismounted) from the mobile member, or is mounted on the mobile member, the data transmission terminal system 10 notifies this fact by using the GPS flag GF, and sends out the positional information at this time in a similar manner.

Figure 7:
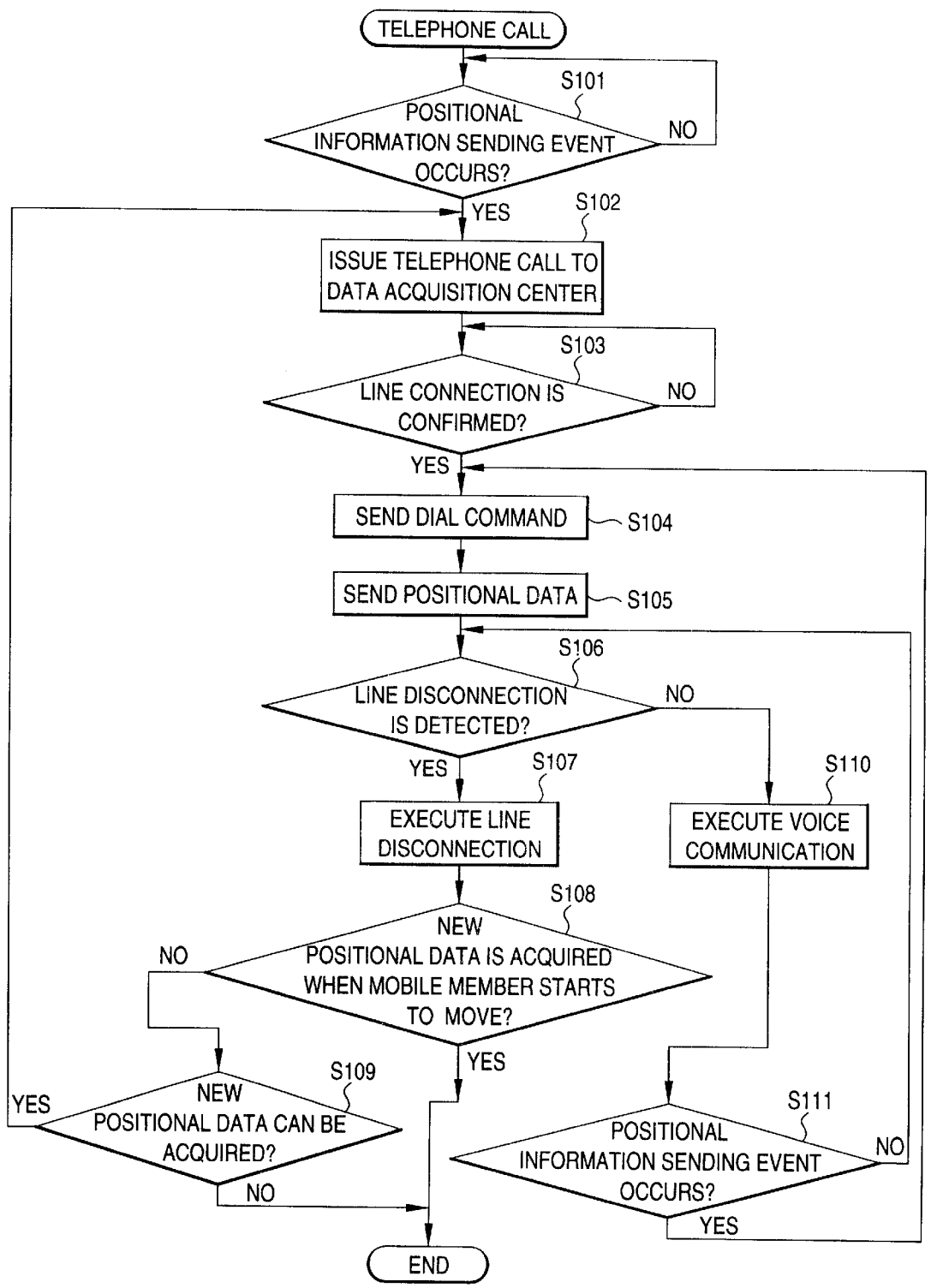
FIG. 7 is a flow chart for explaining a data transmission operation executed in response to a telephone call issued from the data transmission terminal apparatus according to the embodiment mode.
Figure 8:
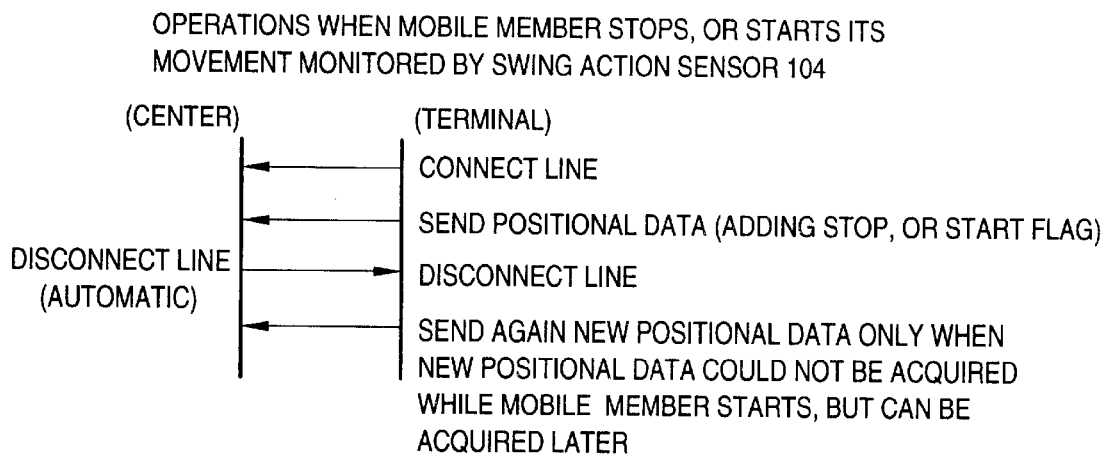
FIG. 8 is a sequential diagram for describing a data transmission operation in response to a telephone call issued from the data transmission terminal apparatus according to the embodiment mode.
Figure 9:
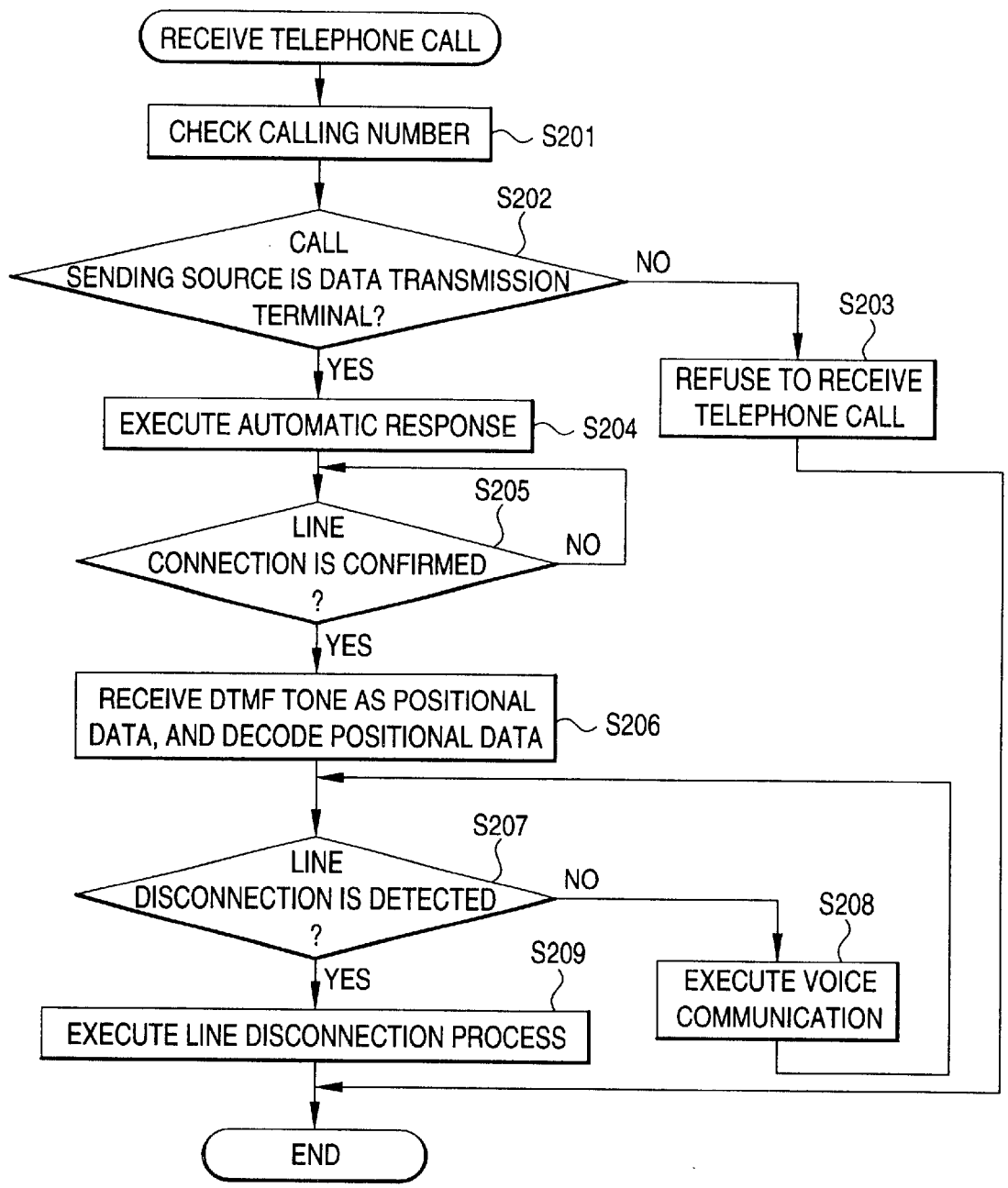
FIG. 9 is a flow chart for describing a reception operation executed on the data reception side of the embodiment mode.

FIG. 7 is a flow chart for describing a process operation routine of the terminal control apparatus when the positional information is sent out in response to the telephone call (notification). FIG. 8 is a diagram for summarizing a sequential operation for sending positional information in response to a telephone call issued from the data transmission terminal system 10 when either the stopping condition or the starting condition of the mobile member is sensed by using the sensor output from the swing action sensor 104. FIG. 9 is a flow chart for describing a process routine of receiving a telephone call by the data acquisition center 20 at this time.

As indicated in FIG. 7, the terminal control apparatus 100 monitors as to whether or not a positional information sending event occurs (step S101). That is, the terminal control apparatus 100 monitors as to whether the mobile member stops its movement, or starts to move by monitoring a sensor output from the swing action sensor 104. Also, the terminal control apparatus 100 monitors as to whether the data transmission terminal system 10 is mounted, or released on, or from the mobile member by monitoring a switch output derived from the mounting/releasing sense switch 105.

Then, when the terminal control apparatus 100 judges that the positional information sending event occurs, this terminal control apparatus 100 performs an automatic telephone calling operation by using the telephone number of the data acquisition center 20 stored in the memory 121 (step S102). In other words, after the off-hook command and the dial command are sequentially sent to the portable telephone 11, the terminal control apparatus 100 transmits the code of the telephone number of the data acquisition center 20 to the portable telephone 11. As a result, the portable telephone 11 executes the telephone calling operation.

This telephone calling operation contains the telephone number information of the data transmission terminal system 10 as the telephone calling number. Upon receipt of this telephone call, as indicated in FIG. 9, the data acquisition center 20 checks the telephone calling number contained in the telephone calling information (step S201), and judges as to whether or not the telephone calling number corresponds to the telephone number of the data transmission terminal system 10 (step S202).

In the case that the telephone calling number is not equal to the telephone number of the data transmission terminal system 10, the data acquisition center 20 refuses the telephone calling (step S203). Then, the process operation passes through this telephone calling process routine.

When the telephone calling number is made coincident with the telephone number of the data transmission terminal system 10, the data acquisition center 20 executes an automatic telephone responding operation (step S204). Then, the data acquisition center 20 confirms a connection of a telephone communication line, and waits for positional information sent as a DTMF tone (step S205).

On the other hand, since the automatic responding operation is executed in the data acquisition center 20 to connect the telephone communication line, the terminal control apparatus 100 provided on the side of the data transmission terminal system 10 confirms this connection of the telephone communication line (step S103). Thereafter, this terminal control apparatus 100 again sends the dial command (step S104), and subsequently sends out the positional information indicated by the above-explained dial signal (step S105). At this time, as shown in FIG. 8, either a stop flag or a start flag is added as the GPS flag GF of the positional information.

As previously described, at the time when this transmitted positional information is entered from the center base station 35 of the portable telephone to the usual wired public telephone network (PSTN), this positional information is converted into a DTMF tone (DTMF signal), and then the DTMF signal is received by the data acquisition center 20. In the data acquisition center 20, the DTMF tone is received as positional information to be decoded (step S206). Then, when the reception of the DTMF tone is accomplished, the data acquisition center 20 holds the telephone communication with the portable telephone 11, if necessary, until the telephone communication line is cut off (disconnected) in order that voice produced from a microphone of the portable telephone 11 is monitored, and a telephone communication is made (step S208).

Then, when the data acquisition center 20 detects that the telephone communication line is cut off (step S207), the data acquisition center 20 executes a telephone communication line cutting operation (step S209), and accomplishes the telephone calling process routine. In this case, there are two possibilities when a line cutting (disconnecting) request is issued. That is, such a line cutting request is issued from the data transmission terminal system 10 (for example, user cuts off telephone line), and also from the data acquisition center 20 (for instance, operator of data acquisition center cuts off telephone line).

The data transmission terminal system 10 checks as to whether the telephone line is manually cut off by the user, or is cut off on the side of the data acquisition center 20 (step S106). When the data transmission terminal system 10 detects that the telephone line is not cut off, the telephone communication line is held so as to set the normal voice communication condition (step S110). Then, under this communication condition, when such an external switch input is made from the swing action sensor 104 and the mounting/releasing sense switch 105, the data transmission terminal system 10 again sends the dial command (step S104), subsequently sends the positional information (step S105), and also is entered into the detection of cutting the telephone line (step S106).

Then, when the data transmission terminal system 10 detects the disconnection of the telephone line at the step S106, a telephone line disconnect operation is executed (step S107). Then, the data transmission terminal system 10 judges that the positional information sending event corresponds to the commencement of the movement and also as to whether or not new data is not acquired while the positional information is transmitted (step S108). When such new data is acquired, the positional information sending process routine by the telephone call is accomplished.

Also, when the new data is not obtained, the data transmission terminal system 10 subsequently judges as to whether or not the new data can be acquired within, for example, a preselected time period (step S109). When such new data can be acquired, the process operation is returned to the previous step S102 at which the positional information sending process operation caused by the telephone call is again carried out. To the contrary, when the new data cannot be acquired at the step S109, the positional information sending process routine caused by this telephone calling is accomplished.

TRANSMISSION OF POSITIONAL INFORMATION CAUSED BY RECEIVING TELEPHONE CALL IN DATA TRANSMISSION TERMINAL SYSTEM 10

This transmission operation is a process operation in response to a positional information sending request issued from the data acquisition center 20 (will be discussed later). As will be explained later, there are 4 sorts of data sending operation modes performed from the data transmission terminal system 10 in response to the positional information sending request issued from the data acquisition center 20. It should be noted that these data sending operation modes are not controlled by the data transmission terminal system 10.

Figure 10:
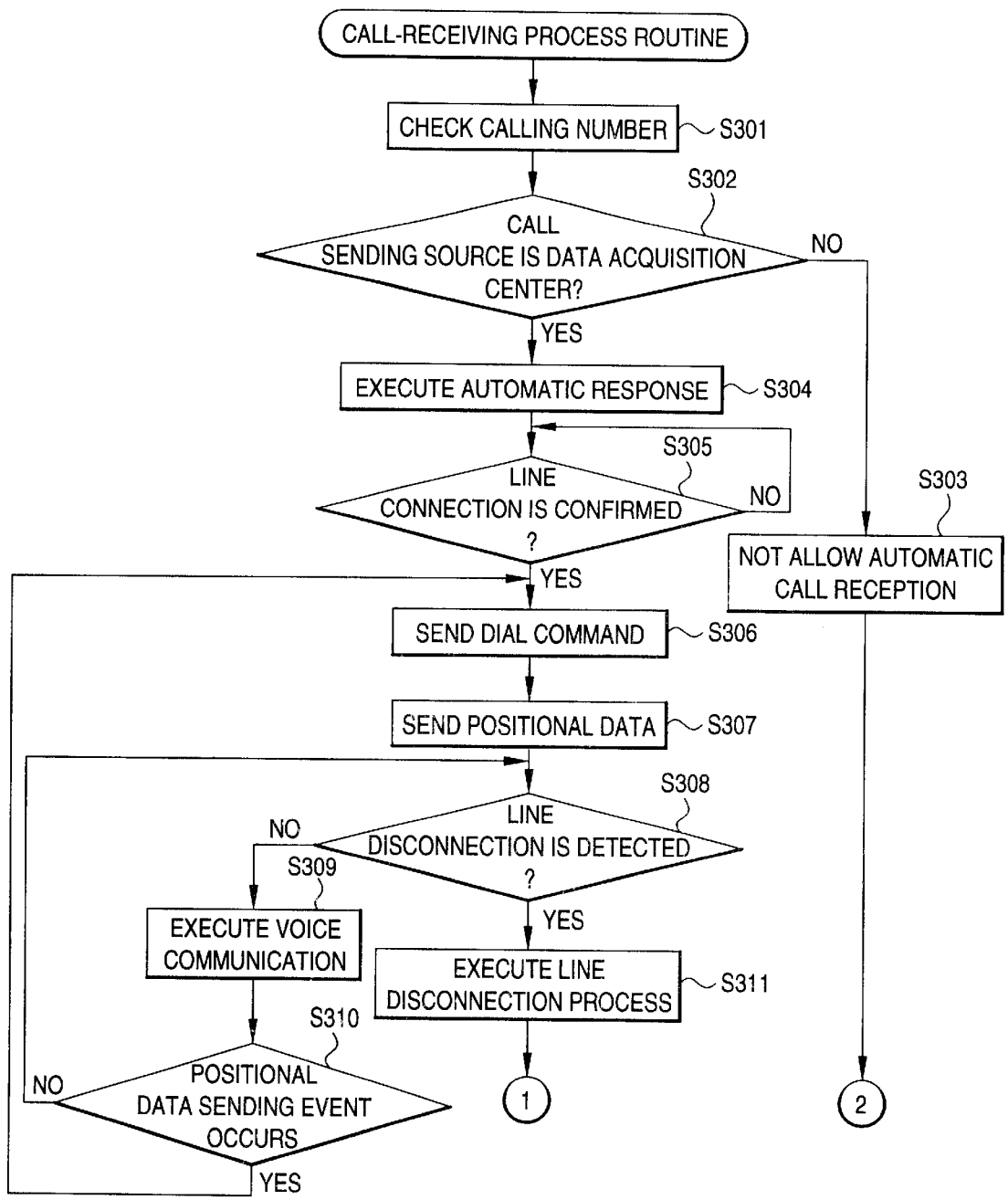
FIG. 10 is a portion of a flow chart for explaining a data transmission operation in response to a request issued from a communication counter party in the data transmission terminal apparatus according to the embodiment.
Figure 11:
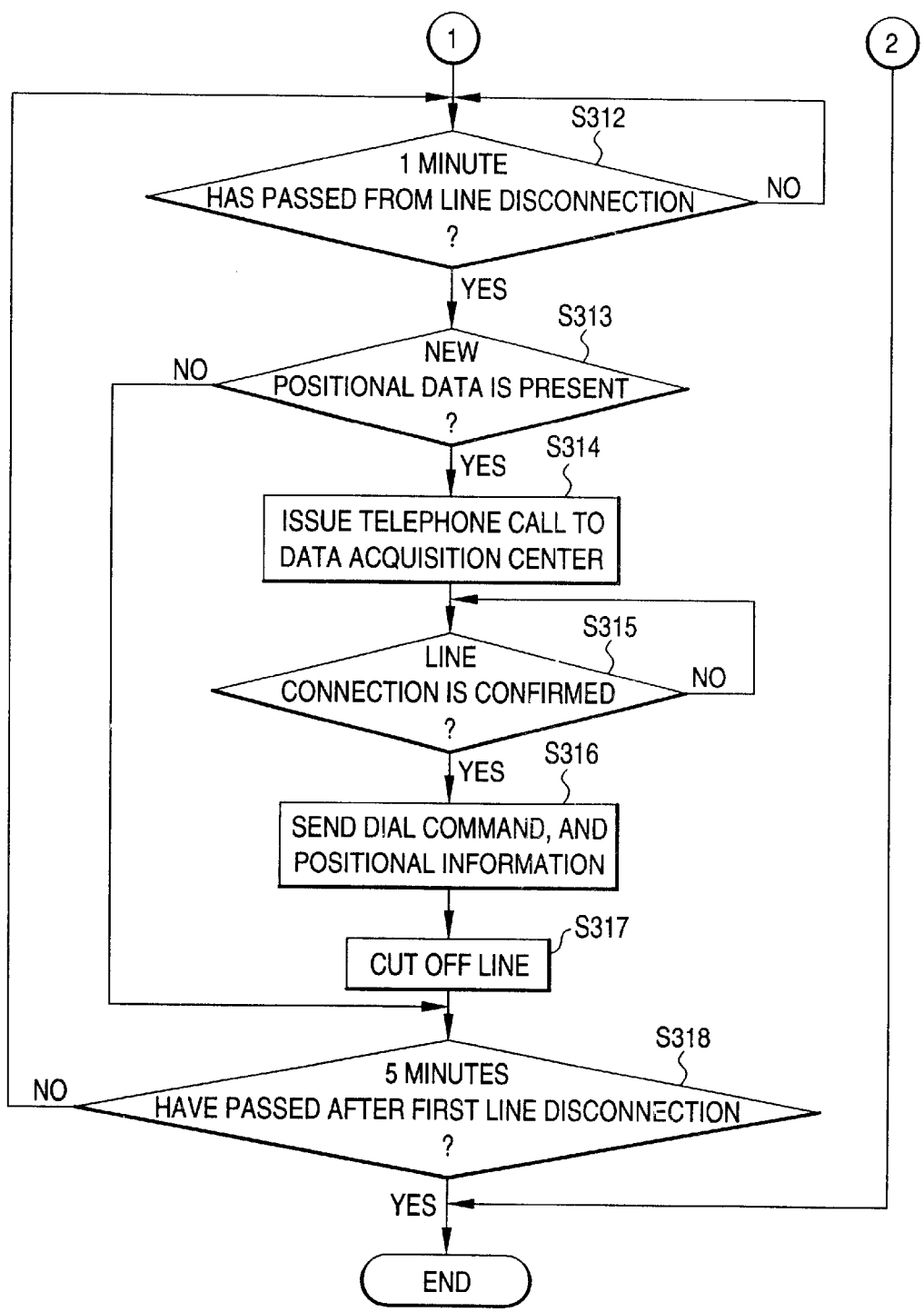
FIG. 11 is another portion of the flow chart shown in FIG. 10 for continuously explaining the data transmission operation.

In the data transmission terminal system 10, a positional information sending routine by receiving a telephone call is merely carried out, which is described in the flow chart of FIG. 10, and FIG. 11 which is a continuation to FIG. 10. In other words, four sorts of the above-explained data transmission modes appear, depending upon both a sending frequent degree (polling frequent degree) of a positional information sending request from the data acquiring center 20, and also telephone line holding time by the data acquisition center 20.

Referring now to the flow charts of FIG. 10 and FIG. 11, a description will be made of a telephone call-receiving process routine in the terminal control apparatus 100 of the data transmission terminal system 10.

First, when a telephone call is received by the data transmission terminal system 10, the terminal control apparatus 100 checks a telephone calling number contained in the telephone calling message (step S301) so as to judge as to whether or not the call sending source is equal to the data acquisition center 20 (step S302). This judgment is carried out by employing the telephone number of the data acquisition center 20 stored in the memory 121. When the call sending source does not correspond to the data acquisition center 20, the terminal control apparatus 100 does not execute an automatic call-receiving operation (step S303), but passes through this call-receiving process routine. In this case, the portable telephone 11 is brought into the same condition as the normal call-receiving condition, so that this portable telephone 11 produces the call ring sound.

In the case that the call sending source is equal to the data acquisition center 20, the terminal control apparatus 100 automatically responds to the telephone call (step S304). Since the telephone communication line is connected in response to this automatic call response, after the terminal control apparatus 100 confirms the connection of the telephone communication line (step S305), the terminal control apparatus 100 sends out the dial command (step S306), and subsequently transmits the positional information expressed by the above-described dial signal (step S307).

Then, the terminal control apparatus 100 monitors a line disconnection made by a manual disconnection by a user, or a line disconnection made by the data acquisition center 20 (step S308). When the terminal control apparatus 100 of the data transmission terminal system 10 detects that the telephone line is not cut off, the telephone communication line is held so as to set the normal voice communication condition (step S309). Then, under this communication condition, when such an external switch input is made from the swing action sensor 104 and the mounting/releasing sense switch 105, the terminal control apparatus 100 again sends the dial command (step S306), and subsequently sends the positional information (step S307), and also enters into the detection of cutting off the telephone line (step S308).

In the case that the line disconnection occurred in either the data acquisition center 20 or the data transmission terminal system 10 is detected at the step S308, a line disconnection process operation is carried out (step S311). Then, the terminal control apparatus 100 is brought into a waiting condition that 1 minute has passed from this line disconnection (step S312), and judges as to whether or not new positional information is acquired (step S313). When the new positional data is not acquired, the terminal control apparatus 100 judges as to whether or not 5 minutes have passed from the first-occurred line disconnection (step S318). If 5 minutes have not yet elapsed, then the process operation is returned to the step S312. At this step S312, the terminal control apparatus 100 is brought into a waiting condition that 1 minute has further passed.

When the terminal control apparatus 10 judges that the new positional data is acquired at the step 313, this terminal control apparatus 10 issues a telephone call to the data acquisition center 20 (step S314), and confirms that the telephone communication line is connected (step S315).

Thereafter, the terminal control apparatus 10 sends out a dial command, and subsequently sends out positional information having a dial signal format (step S316). Then, the telephone communication line is cut off, or disconnected on the side of the data transmission terminal system 10 (step S317).

Thereafter, the call-receiving process operation is advanced to the step S318. At this step S318, the terminal control apparatus 10 judges as to whether or not 5 minutes have passed after the telephone communication line is cut off at the first time. If 5 minutes have not yet passed, the process operation is returned to the step S312. Then, the terminal control apparatus 10 waits for such a state that 1 minute furthermore has elapsed. After 1 minute has passed, the process operations defined at the steps subsequent to the above-explained step S313 are repeatedly carried out. As a result, in the data transmission terminal system 10, the following process operation is repeatedly carried out. That is to say, in response to the data transmission request from the data acquisition center 20, the positional information is sent out. After the telephone communication line is disconnected, if the new positional data can be acquired, the newly acquired positional data is transmitted to the data acquisition center 20 every time 1 minute has elapsed. The new positional data transmission operation is continuously performed for 5 minutes. It should also be noted that the time duration required for sending out the positional information with employment of the dial signal is several seconds, namely the positional information can be transmitted within a very short time duration.

Since the positional information transmission operation is intermittently carried out for 5 minutes, even when the positional information sent out from the data transmission terminal system 10 contains an error in response to the telephone call issued from the data acquisition center 20, the new positional information can be acquired from the GPS receiver 12 during 5 minutes, then the newly acquired positional data (information) can be firmly transmitted to the data acquisition center 20 without resending the positional information having the error.

TRANSMISSION OPERATION MODE CONTROL FOR POSITIONAL INFORMATION FROM DATA TRANSMISSION TERMINAL SYSTEM 10 BY DATA ACQUISITION CENTER 20

In the embodiment, the transmission operation mode of the positional information from the data transmission terminal system 10 can be selectively controlled in accordance with both the polling frequent degree executed from the data acquisition center 20 to the data transmission terminal system 10, and also the holding time of the telephone communication line established between the data transmission terminal system 10 and the data acquisition center 20.

As previously explained, as the transmission operation mode of the positional information, there are four sorts of transmission operation modes. That is, in the embodiment mode, there are provided a single operation mode, a continuous operation mode, an interrupt operation mode, and a blocking operation mode. Now, a description will be made of the respective positional information transmission operation modes.

SINGLE OPERATION MODE

Figure 12:
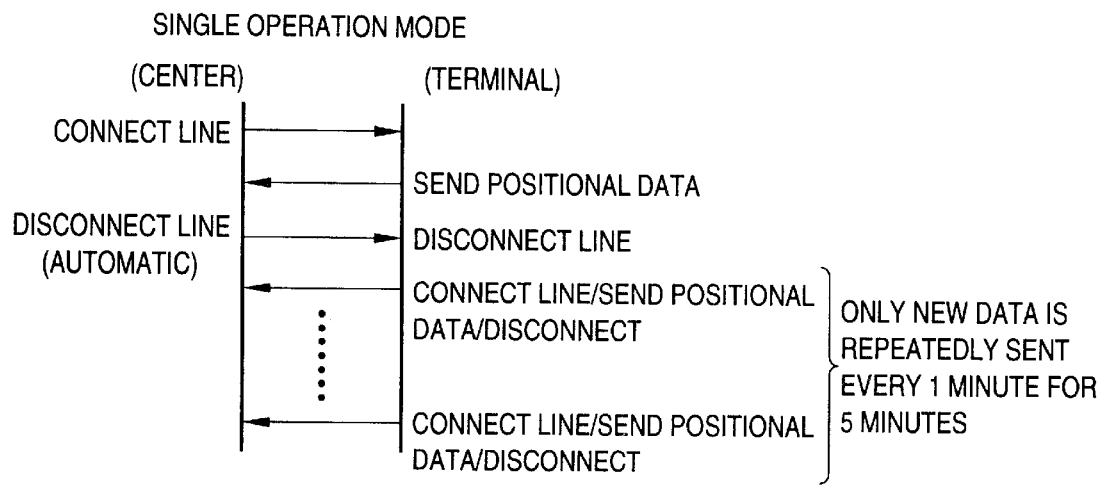
FIG. 12 is a sequential diagram for explaining a first example of the data transmission mode from the data transmission terminal apparatus according to the embodiment.
Figure 16:
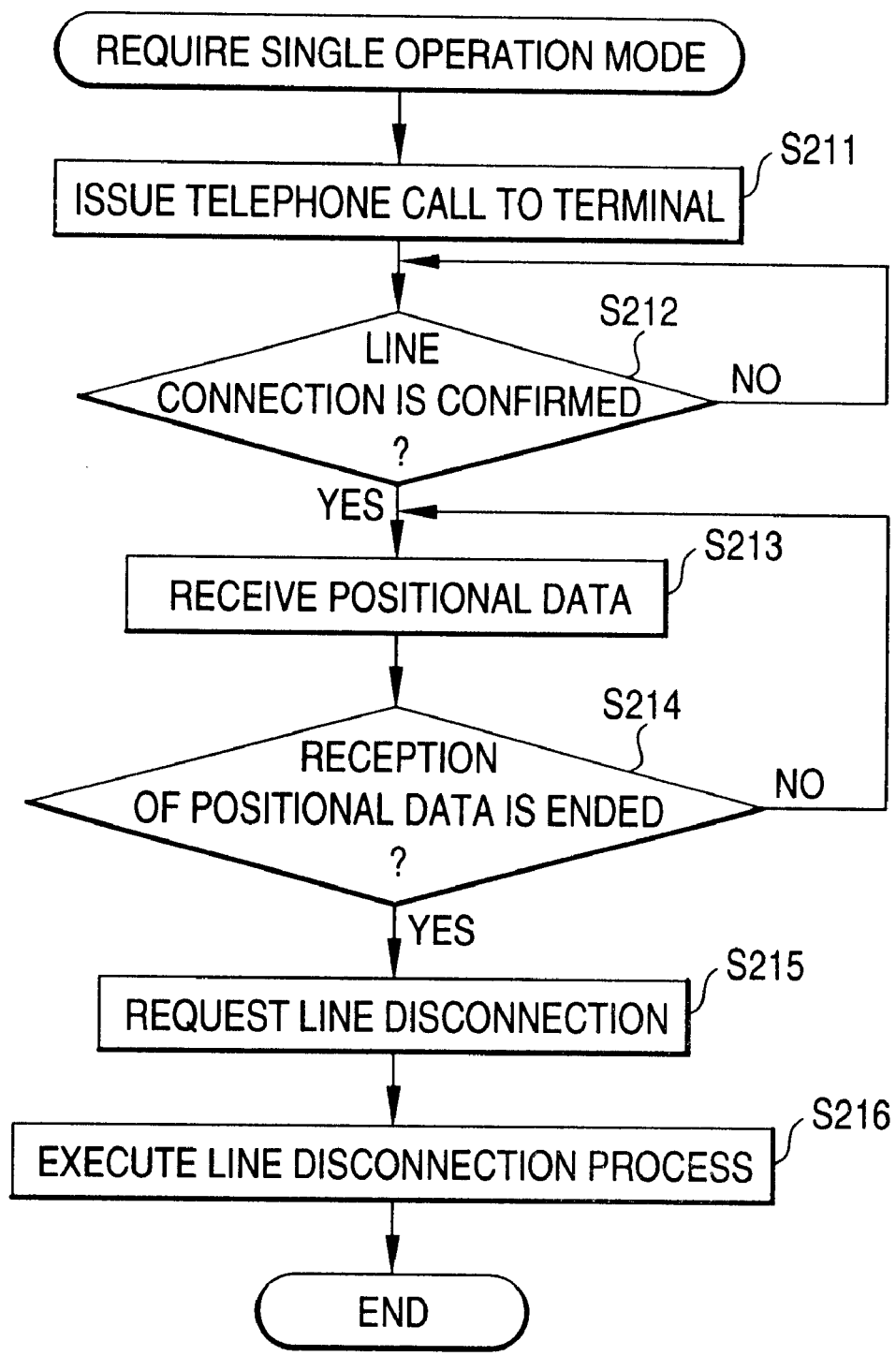
FIG. 16 is a flow chart for explaining a data request operation by a communication counter party so as to execute the first example of the data transmission mode.

FIG. 12 is a sequence diagram for explaining operations executed between the data acquisition center 20 and the data transmission terminal system 10 in such a case that the single operation mode is carried out by the data transmission terminal system 10. FIG. 16 is a flow chart for describing a process operation routine in which this single operation mode is performed by the data transmission terminal system 10 in the data acquisition center 20.

To perform the single operation mode, an operator clicks a button icon for requesting the single operation mode on a graphic user interface (GUI) screen of the display of the personal computer 22 in the data acquisition center 20. Then, the process routine shown in FIG. 16 is automatically carried out.

That is, first, a telephone call is issued to the data transmission terminal system 10. The telephone call is performed by an automatic telephone calling operation by using the telephone number of the portable telephone 11 of the data transmission terminal system 10 (step S211). This telephone number is previously stored in the memory of the personal computer 22.

As previously explained, upon receipt of the telephone call by way of the portable telephone 11, the terminal control apparatus 100 of the data transmission terminal system 10 confirms that the calling number contained in this telephone calling information corresponds to the telephone number of the data acquisition center 20, and performs the automatic responding operation (step S114 of FIG. 10). As a result, the telephone communication line is established which involves the wireless line 31 of the portable telephone and the line 33 of the public telephone network 32 shown in FIG. 2. Then, as previously explained, since the terminal control apparatus 100 sends out the positional information in the dial signal format, this dial-signal-formatted positional information is reached to the data acquisition center 20 in a DTMF signal state.

Thus, in the data acquisition center 20, after the establishment of the telephone communication line is confirmed (step S212), the positional information having the DTMF signal format is received (step S213). Then, when the reception of the positional information is completed (step S214), the data acquisition center 20 sends out a line disconnection request (step S215) to execute the line disconnection process operation (step S216). With execution of the above-described process operations, the process routine explaining for the single operation mode for sending out the positional information is accomplished.

When a single operation request issued from the data acquisition center 20 is received, the process operation shown in FIG. 12 is carried out by the above-described call-receiving process operation shown in FIG. 10 and FIG. 11 in the data transmission terminal system 10.

In other words, in response to the line connection request issued from the data acquisition center 20 to the data transmission terminal system 10 by way of the telephone call, the positional information is sent out from the data transmission terminal system 10. In the data acquisition center 20, upon receipt of this positional information, since the line disconnection request is sent out, the line is disconnected, or cut off. As previously explained, after the line is cut off, the data transmission terminal system 10 repeatedly transmits only the new positional data to the data acquisition center 20 during 5-minute time period every time 1 minute has elapsed.

CONTINUOUS OPERATION MODE

Figure 13:
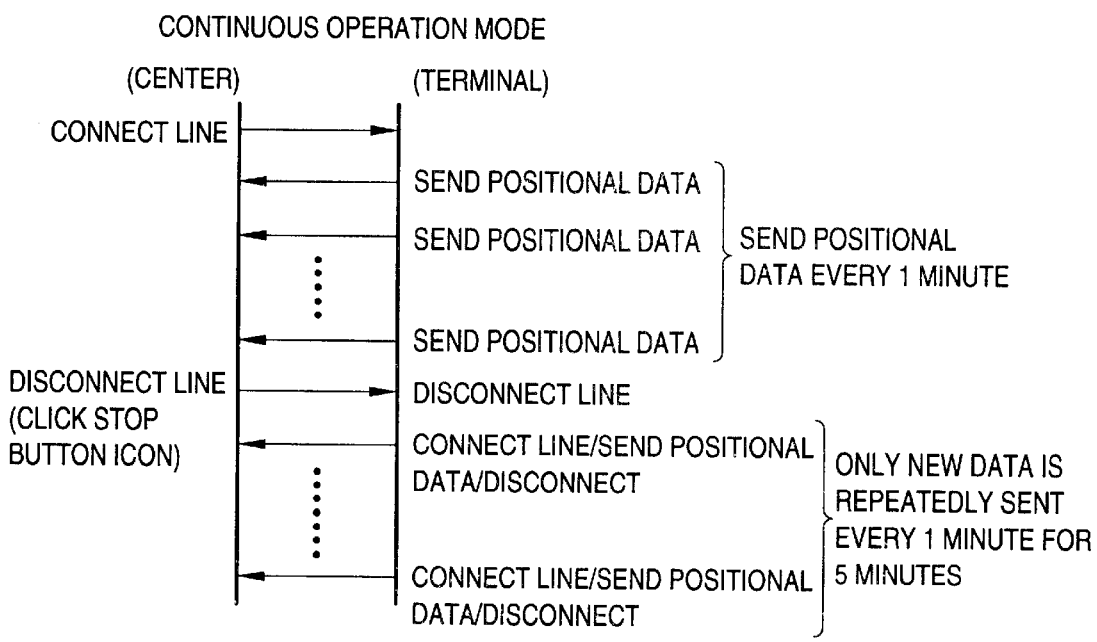
FIG. 13 is a sequential diagram for explaining a second example of the data transmission mode from the data transmission terminal apparatus according to the embodiment.
Figure 17:
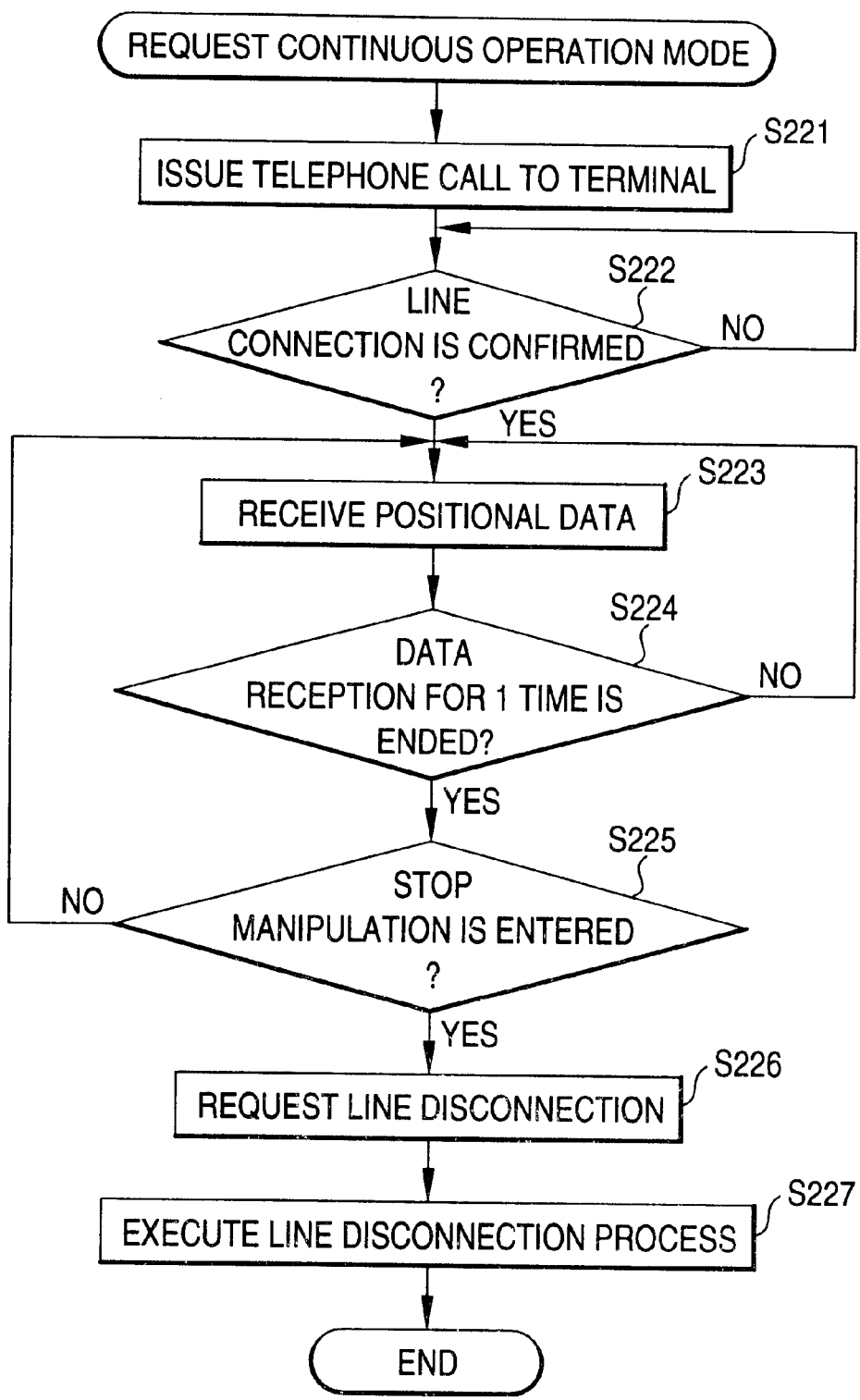
FIG. 17 is a flow chart for explaining a data request operation by a communication counter party so as to execute the second example of the data transmission mode.

FIG. 13 is a sequence diagram for explaining operations executed between the data acquisition center 20 and the data transmission terminal system 10 in such a case that the continuous operation mode is carried out by the data transmission terminal system 10. FIG. 17 is a flow chart for describing a process operation routine in which this continuous operation mode is performed by the data transmission terminal system 10 in the data acquisition center 20.

To perform the continuous operation mode, an operator clicks a button icon for requesting the continuous operation mode on the graphic user interface (GUI) screen of the display of the personal computer 22 employed in the data acquisition center 20. Then the process routine shown in FIG. 17 is automatically carried out.

That is, first, similar to the above case, a telephone call is issued to the data transmission terminal system 10 (step S221).

As previously explained, upon receipt of the telephone call by way of the portable telephone 11, the terminal control apparatus 100 in the data transmission terminal system 10 confirms that the calling number contained in this telephone calling information corresponds to the telephone number of the data acquisition center 20, and performs the automatic responding operation (step S114 of FIG. 10). As a result, the telephone communication line is established. Then, as previously explained, since the terminal control apparatus 100 sends out the positional information in the dial signal format, the dial-signal-formatted positional information is reached to the data acquisition center 20 in a DTMF signal state.

Thus, in the data acquisition center 20, after the establishment of the telephone communication line is confirmed (step S222), the positional information having the DTMF signal format is received (step S223). Then, when the reception of this positional information is completed (step S224), the data acquisition center 20 judges as to whether or not a stop manipulation for the continuous operation is entered by, for example, clicking a stop button icon by an operator (step S225). If no stop manipulation for the continuous operation is entered, the process operation is returned to the step S223 without issuing the line disconnection request.

As previously explained with reference to FIG. 10, and also as represented in FIG. 13, when the line is not cut off, the positional information is repeatedly sent out on the side of the data transmission terminal system 10 every time 1 minute has passed. As a consequence, the transmitted positional information is repeatedly received every time 1 minute has elapsed at the steps S223 and S224 in the data acquisition center 20. The reception process operation is repeatedly performed until the stop button icon is clicked by the operator.

Then, when the stop button icon is clicked by the operator, the data acquisition center 20 sends out the line disconnection request (step S226) so as to execute the line disconnection process operation (step S227). With execution of the above-described process operations, the process routine for explaining the continuous operation mode for sending out the positional information is accomplished.

As apparent from the explanations of FIG. 10 and FIG. 11, also in the continuous operation request, after this line is cut off, the terminal system 10 repeatedly transmits only the new positional data to the data acquisition center 20 during 5-minute time period every time 1 minute has elapsed, as represented in FIG. 13.

INTERRUPT OPERATION MODE

Figure 14:
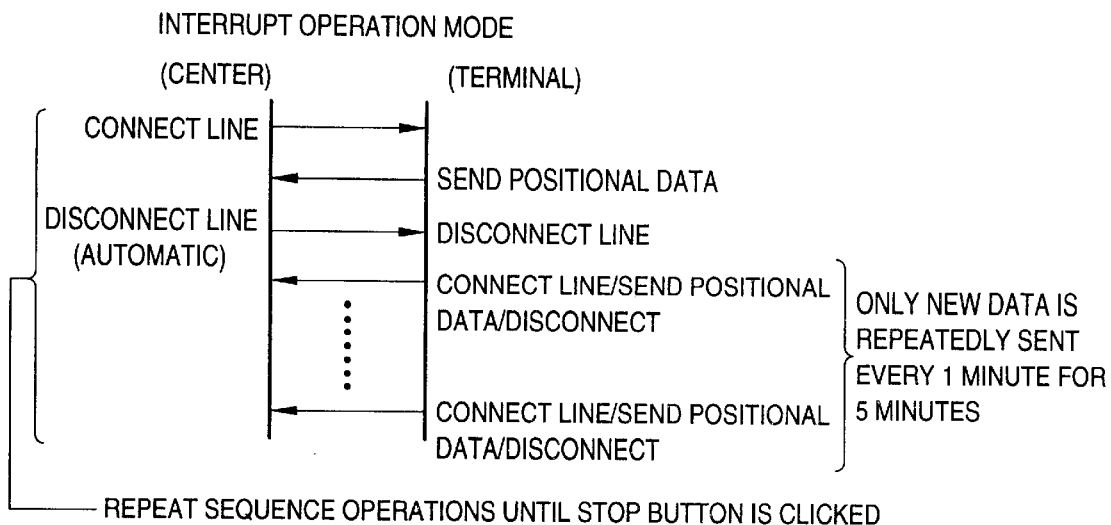
FIG. 14 is a sequential diagram for explaining a third example of the data transmission mode from the data transmission terminal apparatus according to the embodiment.
Figure 18:
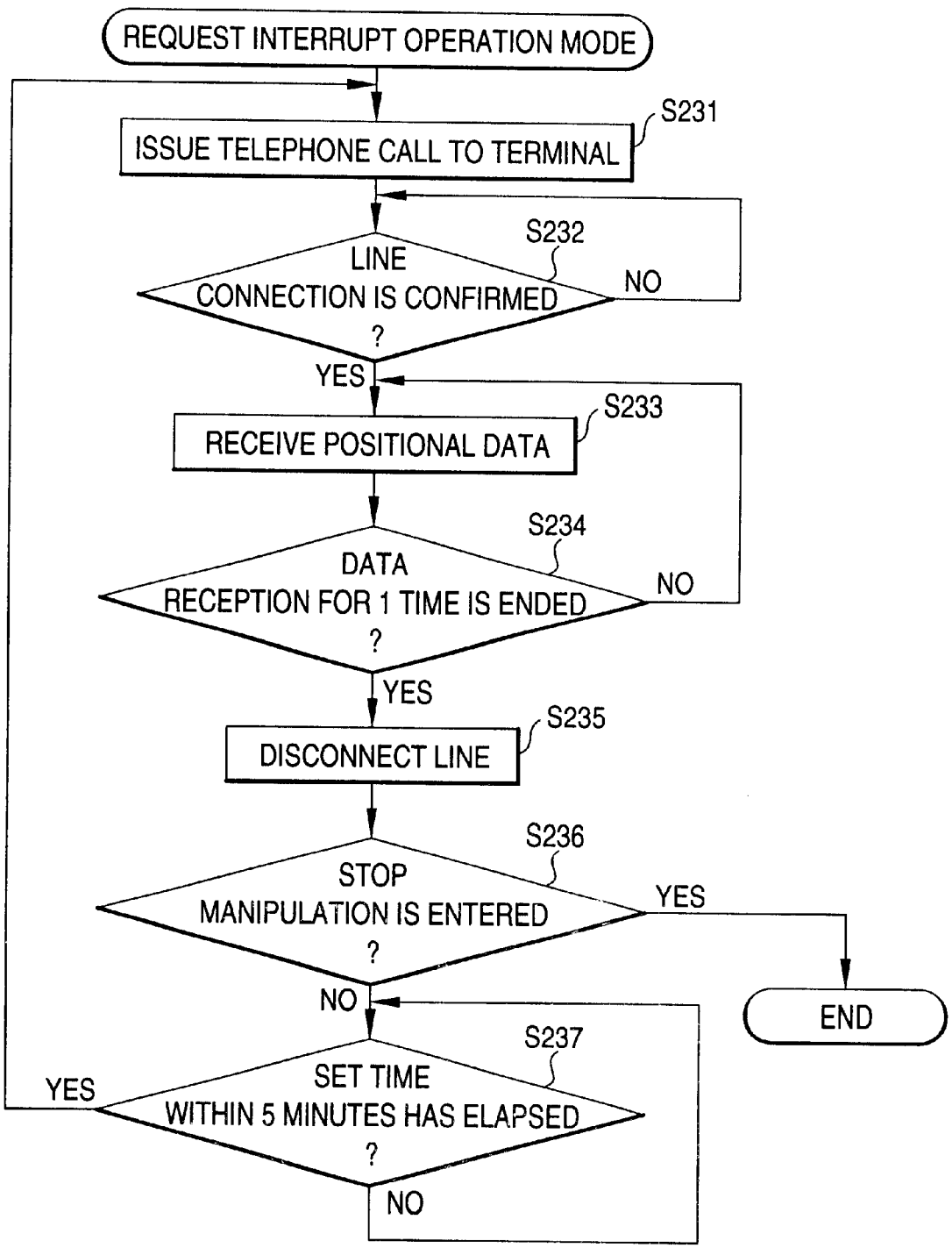
FIG. 18 is a flow chart for explaining a data request operation by a communication counter party so as to execute the third example of the data transmission mode.

FIG. 14 is a sequence diagram for explaining operations executed between the data acquisition center 20 and the data transmission terminal system 10 in such a case that the interrupt operation mode is carried out by the data transmission terminal system 10. FIG. 18 is a flow chart for describing a process operation routine in which this interrupt operation mode is performed by the data transmission terminal system 10 in the data acquisition center 20.

To perform this interrupt operation mode, an operator clicks a button icon for requesting the interrupt operation mode on a graphic user interface (GUI) screen of the display of the personal computer 22 in the data acquisition center 20, and also sets interrupt repetition time within 5 minutes. As a consequence, the process routine shown in FIG. 18 is automatically carried out.

That is, first, a telephone call is issued to the data transmission terminal system 10 in a similar manner to the above case (step S231).

As previously explained, upon receipt of the telephone call by way of the portable telephone 11, the terminal control apparatus 100 of the data transmission terminal system 10 confirms that the calling number contained in this telephone calling information corresponding to the telephone number of the data acquisition center 20, and performs the automatic responding operation (step S114 of FIG. 10). As a result, the telephone communication line is established. Then, as previously explained, since the terminal control apparatus 100 sends out the positional information in the dial signal format, the dial-signal-formatted positional information is reached to the data acquisition center 20 in a DTMF signal state.

Thus, in the data acquisition center 20, after the establishment of the telephone communication line is confirmed (step S232), the positional information having the DTMF signal format is received (step S233). Then, when the reception of the positional information is completed (step S234), the data acquisition center 20 sends out a line disconnection request to execute the line disconnection process operation (step S235).

The terminal control apparatus 100 checks as to whether or not a stop manipulation for the interrupt operation mode is entered by, for example, clicking the stop button icon by an operator (step S236). When the stop manipulation is not entered, the terminal control apparatus 100 is brought into such a waiting state determined by the setting time set within 5 minutes. Thereafter, the process operation is returned to the previous step S231 at which the above-described process operation is repeatedly carried out.

As indicated in FIG. 10, the data transmission terminal system 10 operates in such a manner that only new positional data is sent out every time 1 minute has elapsed during 5-minute time period after the line is disconnected. As a result, when the next positional information transmission request is reached from the data acquisition center 20 within 5 minutes, the line is cut off every time 1 minute has passed. However, this data transmission terminal system 10 operates in such a manner that the transmission of the positional information is repeatedly carried out every time 1 minute has passed. In other words, the data transmission terminal system 10 interruptively repeats the transmission operation of the positional information. The process operation is repeatedly carried out until the stop button icon is clicked by the operator.

Then, when the stop button icon is clicked, the data acquisition center 20 accomplishes the process operation routine.

BLOCKING OPERATION MODE

Figure 15:
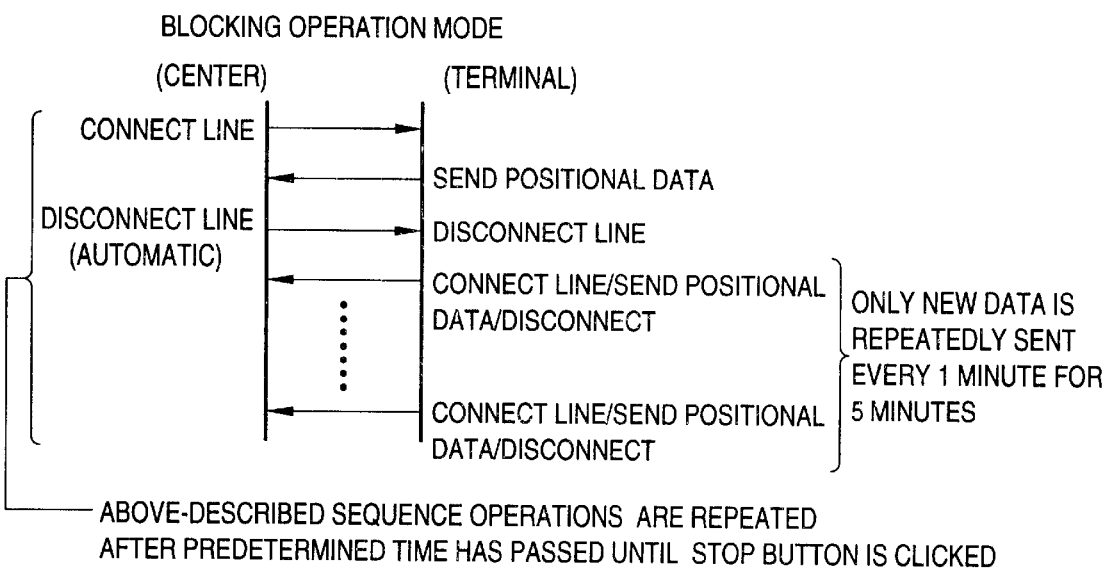
FIG. 15 is a sequential diagram for explaining a fourth example of the data transmission mode from the data transmission terminal apparatus according to the embodiment.
Figure 19:
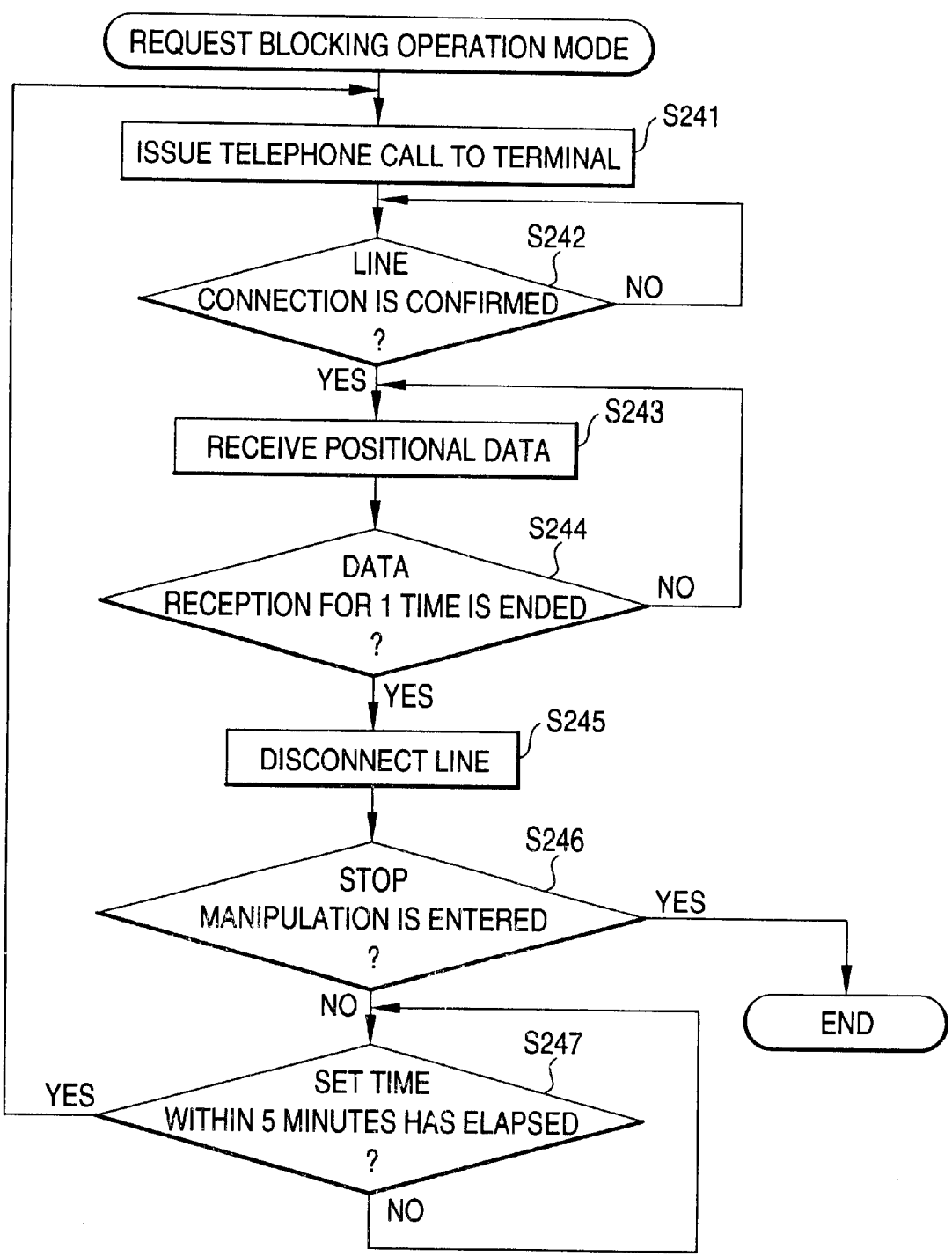
FIG. 19 is a flow chart for explaining a data request operation by a communication counter party so as to execute the fourth example of the data transmission mode.

FIG. 15 is a sequence diagram for explaining operations executed between the data acquisition center 20 and the data transmission terminal system 10 in such a case that the blocking operation mode is carried out by the data transmission terminal system 10. FIG. 19 is a flow chart for describing a process operation routine in which the blocking operation mode is performed by the data transmission terminal system 10 in the data acquisition center 20.

To perform the blocking operation mode, an operator clicks a button icon for requesting the blocking operation mode on a graphic user interface (GUI) screen of the display of the personal computer 22 in the data acquisition center 20, and also sets blocking repetition time for longer than 5 minutes. As a consequence, the process routine shown in FIG. 19 is automatically carried out.

The blocking operation mode owns the following different point from that of the above-explained interrupt operation mode. That is, in the interrupt operation mode, the transmission operation of the positional information is intermittently carried out from the data transmission terminal system 10 without any interruption, whereas in the blocking operation mode, after the new positional information is transmitted every 1 minute during a time period of 5 minutes after the line is disconnected, the set time is equal to time "Ta" longer than, or equal to 5 minutes. As a consequence, there is such a time period defined by "Ta−5" that the new positional data is not transmitted. Other process operations of this blocking operation mode are completely identical to those of the interrupt operation mode.

Accordingly, also in the flow chart of FIG. 19, process operations defined from the step S241 to the step S247 correspond to the step S231 to the step S237 shown in FIG. 18, respectively. It should be understood that the set time in the step S247 is set longer than, or equal to 5 minutes, which is different from the step S237 of FIG. 18.

The blocking operation mode owns another different point from that of the interrupt operation mode with respect to power consumption required in the data transmission terminal system 10 in such a case that the power consumption on the side of the data transmission terminal system 10 is controlled as described below.

CONSUMED POWER CONTROL FOR DATA TRANSMISSION TERMINAL SYSTEM 10

OPERATION POWER SUPPLY CONTROL BY POLLING OPERATION FROM DATA ACQUISITION CENTER 20

In accordance with the embodiment, in the terminal control apparatus 100 of the data transmission terminal system 10, after the telephone communication line established with respect to the data acquisition center 20 has been cut off, the terminal control apparatus 100 interruptedly transmits the new positional data every 1 minute for the time period of 5 minutes. After this interrupted data transmission has been carried out, if no telephone call (data transmission request) is issued from the data acquisition center 20, the terminal control apparatus 100 controls the GPS power supply control unit 124 so as to turn OFF the power supply to the GPS receiver 12.

Similarly, even in a pause time occurring every 1 minute while the new positional data is intermittently transmitted every time 1 minute has elapsed during the time period of 5 minutes after the telephone communication line has been disconnected, the terminal control apparatus 100 controls the GPS power supply control unit 124 so as to turn OFF the power supply to the GPS receiver 12.

Also, in the case that no telephone call is issued from the data acquisition center 20 after the new positional data is intermittently transmitted every time 1 minute has elapsed during the time period of 5 minutes after the telephone communication line has been cut off, the terminal control apparatus 100 is brought into such a standby condition that all of the functions of the CPU 120, the built-in module, and the oscillator of this terminal control apparatus 100 are stopped. Since the oscillator is stopped, the power consumption is considerably reduced. Under the standby condition, the storage content of the internal register of this CPU 120, and the data of the internal RAM are saved.

The terminal control apparatus 100 under standby condition may be recovered by an external interrupt, for example, by detecting starting/stopping operations of the mobile member by way of the telephone calling operation and the swing action sensor. Also, this terminal control apparatus 100 under standby condition may be recovered by being reset.

Because such a power consumption control is carried out, in the single operation mode, the power supply of the GPS receiver 12 is turned OFF after approximately 5 minutes since the data sending request has been issued from the data acquisition center 20. Also, the terminal control apparatus 100 is brought into the standby condition, resulting in low power consumption.

In the interrupt operation mode, since the power supply of the GPS receiver 12 is turned OFF within the pause time while the positional information is transmitted every time 1 minute has passed for the time period of 5 minutes after the line is disconnected, the electric power required for the operation of the GPS receiver 12 can be reduced.

Also, in the blocking operation mode, in addition to the above-described merit achieved in the interrupt mode, the power supply of the GPS receiver 12 is turned OFF during a time period defined by the set time. Furthermore, the terminal control apparatus 100 is also brought into the standby condition, resulting in low power consumption.

In this case, in accordance with the embodiment, the power supply control data need not be transmitted from the data acquisition center 20 to the data transmission terminal system 10, but only such a telephone call is issued. As the data transmission terminal system 10, then the power supply can be controlled.

POWER CONSUMPTION CONTROL IN RESPONSE TO MOVING CONDITION OF MOBILE MEMBER

As previously explained, when it is so judged that the movement of the mobile member (moving object) is stopped by using the swing action sensor 104, the telephone call is issued from the data transmission terminal system 10 to the data acquisition center 20 and then the positional information added with the stop flag is sent. Then, the terminal control apparatus 100 of the data transmission terminal system 10 waits for the line disconnection of the data acquisition center 20, and disconnects the line provided on the data transmission terminal system 10. Thereafter, the terminal control apparatus 100 turns OFF the power supply of the GPS receiver 12.

Also, in such a case that it is so judged that the movement of the mobile member is stopped by using the swing action sensor 104 and this stop condition is continued for a time period e.g. longer than, or equal to 1 hour, not only the power supply of the GPS receiver 12, but also that of the terminal control apparatus 100 are turned OFF. Under stop condition, since there is no change in the position and further the positional information transmission is no longer required, both the measurement and transmission of such unnecessary positional information are stopped so as to reduce the power consumption.

When the power supply of the GPS receiver 12 and the power supply of the terminal control apparatus 100 are turned OFF, the dial signal is automatically sent to the data acquisition center 20 so as to notify this OFF operation by using the GPS flag GF before this OFF operation is carried out.

When the data transmission request is issued from the data acquisition center 20 by sending the telephone call, the terminal control apparatus 100 controls the GPS power supply control unit 124 so as to cause the GPS receiver 12 to immediately turn ON the power supply thereof.

At this time, when the CPU 120 of the terminal control apparatus 100 is brought into either the standby condition or the power supply OFF-state, the telephone call detecting apparatus 103 detects the electromagnetic wave transmitted from the portable telephone 11, and controls the terminal control apparatus 100 based on this detected signal in such a manner that the power supply of this terminal control apparatus 100 is turned ON so as to recover the terminal control apparatus 100.

Under movement condition of the mobile member where the sensor signal outputted from the swing action sensor 104 is continuously produced, the power supply of the terminal control apparatus 100 of the data transmission terminal system 10 is continuously turned ON.

When the external power supply is used to update the almanac information, the swing action sensor does not monitor. This is because such a problem can be avoided. That is, the power supply of the GPS receiver 12 is turned OFF.

In the case that the GPS receiver 12 is brought into the stop condition for a long time period, or is unable to receive the GPS signal transmitted from the satellite in such a place as an underground parking lot, even when this GPS receiver 12 under stop condition is energized, or the GPS signal is retransmitted from the satellite, the GPS receiver 12 is required to receive the almanac data and the ephemeris data required for the GPS measurement, namely cannot immediately carry out the GPS measurement. For example, approximately 20 minutes are required so as to receive the almanac data, and approximately 5 minutes are required so as to receive the ephemeris data. During this GPS data acquisition time, no GPS measurement can be carried out in the GPS receiver 12.

Under such a circumstance, in accordance with an embodiment, while the data is communicated from the data acquisition center 20 to the data transmission terminal system 10, the high-speed data communication using the modem is employed so as to download in a high speed the almanac and ephemeris information required for the GPS measurement by the GPS receiver 12 into the GPS receiver 12 of the data transmission terminal system 100. As a consequence, the GPS measurement by the GPS receiver 12 can be commenced in such a high speed.

In the above-described embodiment, after the telephone communication line has been connected by the digital portable telephone, the digital dialing function of the network is used to the data communication having a small capacity. As a result, the data communication can be performed in a simple manner and with high reliability without newly performing redundant process operations such as the error correction and the retry process in the application layer.

Also, the negotiation of the data communication is no longer required in the portable telephone. Since the information communication can be done immediately after the telephone communication line has been connected, the line occupation time can be shortened, so that the communication cost can be reduced and there is a merit in view of power consumption.

Also, the conventional data communication system with employment of the modem requires the following process operations. That is, the positional information is sent out from the mobile member, the error contained in this positional information is detected on the center side, and then the responses of "ACK" and "NACK" are returned from the center to the mobile member. On the side of the mobile member, upon receipt of this response, when the "NACK" is required to be re-sent, the data needs to be re-sent from the mobile member side. However, in accordance with the wireless data communication established between the center and the mobile member which is moved in a high speed, the communication errors occur in a higher frequent degree. While both the "NACK" and the data re-sending operation are repeatedly performed, the position of this high-speed moving mobile member would be changed. As a result, there is no meaning such that the data is re-sent. Therefore, in the normal position monitoring system for the mobile member, when the data is re-sent, the latest positional information is newly re-sent.

To the contrary, in accordance with the embodiment, the latest positional information is transmitted in the continuous manner without sending/re-sending the "ACK" and "NACK". As a consequence, since the re-send process operation by sending/re-sending the "ACK" and "NACK" is no longer required, the data transmission can be effectively carried out.

On the other hand, the positional information is transmitted from the data transmission terminal system 10 to the center base station of the portable telephone in the digital code to be converted into the DTMF tone in this center base station, and then this DTMF tone is received by the data acquisition center 20. As a consequence, since the digital positional data is transmitted between the data transmission terminal system 10 and the center base station of the portable telephone, the correct positional information can be communicated while the high reliability of the data is maintained.

Also, in the present embodiment, the DTMF signal is employed when the positional information is transmitted from the data transmission terminal system 10 to the data acquisition center 20. However, as to the data transmission request issued from the data acquisition center 20 to the data transmission terminal system 10, the polling operation effected from the data acquisition center 20 to the data transmission terminal system 10 is handled as the data transmission request, so that the DTMF signal need not be used.

The DTMF signal derived from the data acquisition center 20 cannot be transmitted via the telephone communication link (telephone communication line) to the data transmission terminal system 10, but only the DTMF tone (DTMF signal) is merely transmitted from the data acquisition center 20. However, this method owns such a problem that the DTMF signal is largely distorted by the codec of the portable telephone 11, and therefore the DTMF signal cannot be correctly decoded. As previously described, in accordance with the embodiment, since the DTMF signal need not be employed so as to issue the data transmission request from the data acquisition center 20 to the data transmission terminal system 10, such a problem does not occur.

As a result, according to the embodiment, there is such an advantage that the latest information can be continuously acquired with maintaining high reliability even under the following difficult environments. That is, since the control information can be hardly transmitted from the data acquisition center to the mobile station, the procedure of the "ACK", "NACK" and re-sending cannot be employed.

Also, in accordance with the embodiment, since the power saving operation on the side of the data transmission terminal system is dynamically changed in response to the access frequent degree (polling frequent degree) issued from the side of the data acquisition center, the precision and the reliability of the positional information can be improved with keeping the power saving effects, as compared with the conventional system.

In other words, as the conventional power saving methods for a portable type wireless telephone apparatus such as a portable telephone and also for a battery-driven moving object position detecting terminal containing a position measuring means such as a GPS system, a timer is provided inside a housing, and after a signal reception operation is carried out during a constant time period, a supply of electric power is interrupted during a constant time period. The power saving methods may extend the virtual operating time. However, this conventional power saving method causes the below-mentioned problem, namely lowering of position measuring probability under mobile environment.

That is, the mobile member communication owns physical problems caused by multipath of electromagnetic waves, fading, and shielding by disturbances. Furthermore, in a broad area service by a large number of base stations, for instance, in a portable telephone service, various communication errors happen to occur, which are caused by synchronization shifts contained in signals. These synchronization shifts are produced when channels of base stations are switched while moving objects are transported. In the conventional intermittent operation, the power supply of the receiver apparatus employed in the mobile member terminal and also the power supply of the GPS apparatus thereof are simply turned ON/OFF every time a constant time period has elapsed without considering these communication environments. As a consequence, the virtual operating time may be extended by the mutual effects between the deteriorated communication environments and the intermittent operations. However, there is such a problem that the position measuring probability of the mobile member (moving object) is largely lowered, as compared with the position measuring probability achieved when these apparatuses are continuously energized, and the moving object is under stationary state.

As previously explained, since the embodiment does not cause the above-explained conventional problem, the precision and reliability as to the positional information can be improved while maintaining the power saving effect.

Also, in accordance with the present embodiment, the data transmission mode with respect to the data transmission terminal system 10 can be controlled based on the polling frequent degree and the line hold time on the data acquisition center side. That is, the transmission mode of the data from the data transmission terminal system 10 can be controlled without sending the control information to be sent from the data acquisition center 20. As a result, the line occupation time can be shortened and the effective data transmission can be expected.

Also, in accordance with the embodiment mode, the large capacity (bit) data such as the almanac and ephemeris data of the GPS system is downloaded from the data acquisition center 20 to the data transmission terminal system 10 by way of the high-speed communication with employment of the modem. As a consequence, the position measuring operation by the GPS receiver can be commenced in a high speed.

While the above-explained embodiment has described such a case that the position measuring operation of the moving object is carried out and then the acquired positional information is sent from the moving object to the center, the data to be sent is not limited to the positional information.

For instance, the present invention may be applied to a remote monitoring system for a water level, and also to a remote monitoring system for electric power used in a power transforming facility. Furthermore, the invention may be applied to a system capable of gasping an empty condition of a parting lot, and a burglar system.

What is claimed is:

1. A data transmission terminal apparatus comprising:
   a portable type wireless telephone terminal; and
   a terminal control apparatus connected to said portable type wireless telephone terminal, for transmitting data as a dial signal via said portable type wireless telephone terminal to a telephone communication line when said telephone communication line is formed between a data communication counter party and said portable type wireless telephone terminal using a public telephone network, wherein
      said data communication counter party is previously determined; said terminal control apparatus comprises a memory for storing a telephone number of said data communication counter party; and when said terminal control apparatus senses that a telephone call sent via said portable type wireless telephone terminal corresponds to a telephone call issued from said data communication counter party based upon both a calling number contained in said telephone calling information and a content of said memory, said terminal control apparatus automatically responds to said telephone call to thereby form said telephone communication line, and sends out data as a dial signal via the telephone communication line to said data communication counter party, and wherein
      said terminal control apparatus sends out said data as the dial signal to said data communication counter party in response to the telephone call issued from said data communication counter party; repeatedly issues a telephone call to said data communication counter party at a predetermined time interval during a predetermined time period after a line is disconnected; and transmits the data via the formed telephone communication line of said portable type wireless telephone terminal.

2. The data transmission terminal apparatus as claimed in claim 1 wherein:
   when a data transmission request is issued, said terminal control apparatus automatically issues a telephone call through said portable type wireless telephone terminal to said data communication counter party based upon the telephone number stored in said memory, so that said telephone communication line is formed between said data communication counter party and the terminal control apparatus.

3. The data transmission terminal apparatus as claimed in claim 2 wherein:
   both a position measuring apparatus for measuring a present position; and
   sensor means for sensing whether said data transmission terminal apparatus is moved, or stopped are connected to said terminal control apparatus; where
      data which is sent out as a dial signal corresponds to positional information measured by said position measuring apparatus; and said data transmission request is produced when said sensor means senses that movement of said data transmission terminal apparatus is commenced, or stopped.

4. The data transmission terminal apparatus as claimed in claim 1 wherein:
   a position measuring apparatus for measuring a present position is connected to said terminal control apparatus; and data which is sent out as a dial signal corresponds to positional information measured by said position measuring apparatus.

5. The data transmission terminal apparatus as claimed in claim 1 wherein:
   a position measuring apparatus for measuring a present position is connected to said terminal control apparatus; where data which is sent out as a dial signal corresponds to positional information measured by said position measuring apparatus; and when a position measured by said position measuring apparatus is varied, said positional data is sent out as the dial signal.

6. The data transmission terminal apparatus as claimed in claim 1 wherein:
   a position measuring apparatus for measuring a present position is connected to said terminal control apparatus; where data which is sent out as a dial signal corresponds to positional information measured by said position measuring apparatus; and said positional information is sent out as the dial signal at a constant time interval.

7. The data transmission terminal apparatus as claimed in claim 1 wherein:
   a transmission operation mode of said data is changed in response to a hold time of said telephone communication line which is formed by the telephone call issued from said data communication counter party.

8. The data transmission terminal apparatus as claimed in claim 1 wherein:
   when the telephone communication line formed in response to the telephone call issued from said data communication counter party is continued for a time period at least as long as a predetermined time period, said terminal control apparatus repeatedly sends out said data as the dial signal at a constant time interval.

9. The data transmission terminal apparatus as claimed in claim 1 wherein:
   when the telephone communication line formed in response to the telephone call issued from said data communication counter party is held for a time period at least as long as a predetermined time period, said terminal control apparatus sends out said data as the dial signal at a constant time interval when the data to be sent out is varied.

10. The data transmission terminal apparatus as claimed in claim 1 wherein:
    a position measuring apparatus for measuring a present position is connected to said terminal control apparatus; and said data which is sent out as the dial signal corresponds to positional information measured by said position measuring apparatus.

11. The data transmission terminal apparatus as claimed in claim 1 wherein:

an operating power supply of said data transmission terminal apparatus is controlled in response to a polling frequent degree of the telephone call issued from said data communication counter party.

12. The data transmission terminal apparatus as claimed in claim 1 wherein:

both controlling of an operating power supply and changing of a data transmission operation mode are carried out in response to a hold time of the line formed by receiving the telephone call issued from said data communication counter party.

13. A data transmission terminal apparatus comprising:

a portable type wireless telephone terminal; and a terminal control apparatus connected to said portable type wireless telephone terminal, for transmitting data as a dial signal via said portable type wireless telephone terminal to a telephone communication line when said telephone communication line is formed between a data communication counter party and said portable type wireless telephone terminal using a public telephone network, wherein said data communication counter party is previously determined; said terminal control apparatus comprises a memory for storing a telephone number of said data communication counter party; and when said terminal control apparatus senses that a telephone call sent via said portable type wireless telephone terminal corresponds to a telephone call issued from said data communication counter party based upon both a calling number contained in said telephone calling information and a content of said memory, said terminal control apparatus automatically responds to said telephone call to thereby form said telephone communication line, and sends out data as a dial signal via the telephone communication line to said data communication counter party, and wherein a position measuring apparatus for measuring a present position is connected to said terminal control apparatus;

the data sent out as the dial signal corresponds to positional information measured by said position measuring apparatus; and when the telephone call made from said data communication counter party is not issued for a time period at least as long as a predetermined time period, an operating power supply of said position measuring apparatus is turned OFF.

14. A data transmission terminal apparatus comprising:

a portable type wireless telephone terminal; and a terminal control apparatus connected to said portable type wireless telephone terminal, for transmitting data as a dial signal via said portable type wireless telephone terminal to a telephone communication line when said telephone communication line is formed between a data communication counter party and said portable type wireless telephone terminal using a public telephone network, wherein said data communication counter party is previously determined; said terminal control apparatus comprises a memory for storing a telephone number of said data communication counter party; and when said terminal control apparatus senses that a telephone call sent via said portable type wireless telephone terminal corresponds to a telephone call issued from said data communication counter party based upon both a calling number contained in said telephone calling information and a content of said memory, said terminal control apparatus automatically responds to said telephone call to thereby form said telephone communication line, and sends out data as a dial signal via the telephone communication line to said data communication counter party, and wherein both a position measuring apparatus for measuring a present position and sensor means for sensing whether said data transmission terminal apparatus is moved are connected to said terminal control apparatus;

said data which is sent out as the dial signal corresponds to positional information measured by said position measuring apparatus; and when the sensor means senses that movement of said data transmission terminal apparatus is stopped, a power supply of said position measuring apparatus is turned OFF.

15. The data transmission terminal apparatus as claimed in claim 14 wherein:

when said sensor means senses that the movement of said data transmission terminal apparatus is stopped and said stop condition is continued for a time period at least as long as a predetermined time period, the power supply of said terminal control apparatus is turned OFF.

16. The data transmission terminal apparatus as claimed in claim 15 wherein:

call-reception detecting means for detecting a telephone call received by said portable type wireless telephone terminal are connected to said terminal control apparatus; and when said call-reception detecting means detects that said telephone call is received by the wireless telephone terminal, the power supply of said terminal control apparatus is returned from the OFF state to an ON state.

* * * * *